(12) United States Patent
Huang et al.

(10) Patent No.: US 8,190,414 B2
(45) Date of Patent: May 29, 2012

(54) MODELING OF HYDROCARBON RESERVOIRS CONTAINING SUBSURFACE FEATURES

(75) Inventors: Hao Huang, Houston, TX (US); Jing Wan, Sugar Land, TX (US); Marcus Asmann, Pearland, TX (US); Bruce A. Dale, Sugar Land, TX (US); Timothy K. Ellison, Houston, TX (US); Sheng-Yuan Hsu, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 624 days.

(21) Appl. No.: 12/367,325

(22) Filed: Feb. 6, 2009

(65) Prior Publication Data

US 2009/0248374 A1    Oct. 1, 2009

Related U.S. Application Data

(60) Provisional application No. 61/070,803, filed on Mar. 26, 2008.

(51) Int. Cl.
*G06G 7/48* (2006.01)
(52) U.S. Cl. .......................................... 703/10
(58) Field of Classification Search .................... 703/10, 703/6, 7; 702/6, 13, 14, 18, 104; 706/45; 367/73; 166/245, 305.1; 324/365
See application file for complete search history.

(56) References Cited

U.S. PATENT DOCUMENTS

| 4,640,352 A | * | 2/1987 | Vanmeurs et al. ............ 166/245 |
| 5,740,342 A | | 4/1998 | Kocberber |
| 6,018,497 A | | 1/2000 | Gunasekera |
| 6,101,447 A | * | 8/2000 | Poe, Jr. ............................ 702/13 |
| 6,106,561 A | | 8/2000 | Farmer |
| 6,373,489 B1 | | 4/2002 | Lu et al. |
| 6,421,052 B1 | | 7/2002 | McGuire |
| 6,718,291 B1 | | 4/2004 | Shapiro et al. |

(Continued)

FOREIGN PATENT DOCUMENTS

EP    1 103 921 A1    5/2001

OTHER PUBLICATIONS

Jackson et al., "Prediction of wettability variation and its impact on flow using pore to reservoir-scale simulations", Journal of Petroleum science and engineering, 2003.*

(Continued)

*Primary Examiner* — Kandasamy Thangavelu
(74) *Attorney, Agent, or Firm* — ExxonMobil Upstream Research Company-Law Department

(57) ABSTRACT

A method for modeling a reservoir response in a subsurface system is provided. The subsurface system has at least one subsurface feature. Preferably, the subsurface system comprises a hydrocarbon reservoir. The method includes defining physical boundaries for the subsurface system, and locating the at least one subsurface feature within the physical boundaries. The method also includes creating a finite element mesh within the physical boundaries. The finite element mesh may have elements that cross the at least one subsurface feature such that the subsurface feature intersects elements in the mesh. A computer-based numerical simulation is then performed wherein the effects of the subsurface feature are recognized in the response. The reservoir response may be, for example, pore pressure or displacement at a given location within the physical boundaries.

53 Claims, 12 Drawing Sheets

U.S. PATENT DOCUMENTS

| | | | |
|---|---|---|---|
| 6,766,255 | B2 | 7/2004 | Stone |
| 6,826,520 | B1 | 11/2004 | Khan et al. |
| 6,907,392 | B2 | 6/2005 | Bennis et al. |
| 6,928,399 | B1 | 8/2005 | Watts, III et al. |
| 6,977,866 | B2 * | 12/2005 | Huffman et al. ............... 367/73 |
| 7,006,959 | B1 * | 2/2006 | Huh et al. ..................... 703/10 |
| 7,047,165 | B2 | 5/2006 | Balaven et al. |
| 7,096,122 | B2 | 8/2006 | Han |
| 7,177,764 | B2 * | 2/2007 | Stone ............................. 702/6 |
| 2002/0032494 | A1 | 3/2002 | Kennon et al. |
| 2004/0199329 | A1 | 10/2004 | Stone |
| 2004/0201585 | A1 | 10/2004 | Srivastava et al. |
| 2005/0021234 | A1 * | 1/2005 | Han .............................. 702/13 |
| 2005/0149267 | A1 * | 7/2005 | Van Den Beukel et al. .... 702/14 |
| 2005/0190650 | A1 | 9/2005 | Ferber et al. |
| 2005/0256684 | A1 | 11/2005 | Jin et al. |
| 2005/0273303 | A1 | 12/2005 | Flandrin et al. |
| 2006/0129366 | A1 | 6/2006 | Shaw |
| 2006/0136162 | A1 * | 6/2006 | Hamman et al. ............. 702/104 |
| 2006/0184488 | A1 * | 8/2006 | Wentland ...................... 706/45 |
| 2006/0235667 | A1 * | 10/2006 | Fung et al. ..................... 703/10 |
| 2006/0253759 | A1 | 11/2006 | Wei |
| 2006/0277011 | A1 | 12/2006 | Tardy et al. |
| 2006/0277012 | A1 | 12/2006 | Ricard et al. |
| 2008/0033656 | A1 * | 2/2008 | Herwanger .................... 702/18 |
| 2008/0041594 | A1 * | 2/2008 | Boles et al. ................. 166/305.1 |
| 2008/0091396 | A1 | 4/2008 | Kennon et al. |
| 2008/0133194 | A1 * | 6/2008 | Klumpen et al. ............... 703/10 |
| 2008/0140369 | A1 * | 6/2008 | Rashid et al. .................. 703/10 |
| 2008/0150538 | A1 * | 6/2008 | Andreis ........................ 324/365 |

OTHER PUBLICATIONS

Asadpoure, A. et al., "Developing new enrichment functions for crack simulation in orthotropic media by the extended finite element method", International Journal for Numerical Methods in Engineering, (2007), pp. 2150-2172, v. 69, Wiley, UK.

Babuska, I. et al., "The Partition of Unity Method", International Journal for Numerical Methods in Engineering, (1997), pp. 727-758, v. 40, Wiley, UK.

Daux, Christophe et al., "Arbitrary branched and intersecting cracks with the extended finite element method", International Journal for Numerical Methods in Engineering, (2000), pp. 1741-1760, v. 48, Wiley, UK.

Dolbow, John et al., "An extended finite element method for modeling crack growth with frictional contact", Computer Methods in Applied Mechanics and Engineering, (2001), pp. 6825-6846, v. 190, Elsevier, Netherlands.

Lemonnier, Patrick A., "Improvement of Reservoir Simulation by a Triangular Discontinuous Finite Element Method", SPE 8249, $54^{TH}$ Annual SPE of AIME Technical Conference, Sep. 23-26, 1979, 11 pages, Las Vegas, NV.

Lu, Shaofan et al., "Meshfree and particle methods and their applications", Applied Mechanics Review, Jan. 2002, pp. 1-34, v. 55 No. 1.

Melenk, J. M. et al., "The Partition of Unity Finite Element Method: Basic Theory and Applications", Computer Methods in Applied Mechanics and Engineering, Jan. 1996, pp. 1-30, v. 139.

Moes, N. et al., "A finite element method for crack growth without remeshing", International Journal for Numerical Methods in Engineering, Sep. 10, 1999, 1 page, Wiley, UK.

Rabczuk, T. et al., "A new approach for modelling slip lines in geological materials with cohesive models", International Journal for Numerical and Analytical Methods in Geomechanics, (2006), pp. 1159-1172, v. 30, Wiley, UK.

Strouboulis, T. et al, "The design and analysis of the Generalized Finite Element Method", Computer Methods in Applied Mechanics and Engineering, (2000), pp. 43-69, v. 181, Elsevier, Netherlands.

European Search Report, Jan. 20, 2009, 10 pages.

* cited by examiner

MODELING OF HYDROCARBON RESERVOIRS CONTAINING SUBSURFACE FEATURES

CROSS REFERENCE TO RELATED APPLICATION

This application claims the benefit of U.S. Provisional Application No. 61/070,803, filed Mar. 26, 2008, the entire disclosure of which is incorporated herein by reference for all purposes.

BACKGROUND

1. Field

The present invention relates to the field of reservoir modeling. More specifically, the present invention relates to the modeling of hydrocarbon reservoirs having subsurface features such as fractures, faults, and wellbores which may affect reservoir behavior.

2. Background

The production of hydrocarbons such as oil and gas has been performed for numerous years and in many locations worldwide. To produce hydrocarbons, one or more producer wells are drilled into a subsurface formation of a field. Producer wells comprise a borehole that is formed through the earth surface and down to one or more selected formations. The producer wells are completed using long tubular members that serve as casing. A series of casing strings may be run into the borehole and cemented into place. The wells are completed at the level of a hydrocarbon reservoir.

It is desirable to perform computer modeling on hydrocarbon reservoirs in order to simulate and predict fluid flow and recovery from producer wells. Such simulations are oftentimes based on mathematical formulations that are assumed to govern the interrelationship of various numerical values in a reservoir. These values may represent fluid and fluid flow responses such as formation pore pressure, rock porosity, formation permeability and temperature. These values may also be geomechanical responses such as stress or rock deformation.

Numerical methods are oftentimes employed to simulate and analyze activities associated with hydrocarbon recovery or fluid injection. The finite element method is one effective numerical method for this purpose. Such methods provide an approximate numerical solution to complex differential equations which govern the behavior of the reservoir under a given set of conditions.

In finite element analysis for reservoir modeling, a geological system under study is defined by a finite number of individual sub-regions or elements. These elements have a predetermined set of boundary conditions. Creating the elements entails gridding or "meshing" the formation. A mesh is a collection of elements that fill a space, with the elements being representative of a system which resides in that space. The process of dividing a production area under study into elements may be referred to as "discretization" or "mesh generation."

Finite element methods also use a system of points called nodes. The nodes are placed on geometric shapes which define the elements. The elements are programmed to contain the material properties which define how the structure will react to certain loading conditions. Nodes are placed at a certain density throughout the material under study. For reservoir modeling, changes to the geological system are predicted as fluid pressures or other reservoir values change.

A range of variables can be used in finite element analysis for modeling a reservoir. For fluid flow modeling, reservoir parameters typically include permeability, pressure, reservoir size and, perhaps, temperature. For geomechanical modeling such parameters may include various rock properties such as Poisson's ratio, the modulus of elasticity, shear modulus, Lame' constant, or combinations thereof. Recently, coupled physics simulators have been developed which seek to combine the effects of both fluid flow parameters and geomechanics to generate reservoir responses.

In conventional numerical studies for reservoir simulation, it is important to explicitly track the geometrical shape of the formation under analysis. This means that the elements honor the geometry of the formation. However, the use of finite elements in reservoir modeling is challenged by the presence of subsurface features. In this respect, hydrocarbon reservoirs under production typically contain various forms of natural or man-made subsurface features. Examples of natural subsurface features include faults, natural fractures and formation stratification. Examples of man-made features include perforations from wellbores, fracture wings of a fractured wellbore completion, and wormholes due to acid injection activities. These features create discontinuities that affect reservoir behavior.

Reservoir simulation is also challenged where high gradients of reservoir properties exist. An example of a subsurface feature that presents a high gradient is a wellbore. The wellbore, when viewed as a singular line source or sink for pore pressure, can cause high pressure gradients in the near-well region. Fluid flow and pressure gradients that exist radially around a wellbore are steep. Modeling such gradients generally requires the use of a high density mesh.

Conventional numerical simulators require a grid system that honors the geography of the discontinuity or high gradient area. However, from a geometric standpoint, finite element methods generally prefer a structured mesh. The existence of arbitrarily shaped subsurface features makes it difficult to build a structured mesh. Constructing a high quality mesh for each geometrical variation may require significant man-power and considerable expertise. Failure to honor transmissible boundaries created by wormholes, fractures, stratification breaks and the like can cause post-production reservoir simulations to be inaccurate.

Yet another problem with mesh generating solutions relates to the fact that man-made subsurface structures will change over the life of a reservoir. Evolving subsurface features include newly formed wellbores, wormhole growth or injection-induced fracture growth. Such features require the mesh or grid to evolve accordingly to accommodate the varying geometry of subsurface features. During this mesh evolution process, parameter values which have been stored at nodes or element locations need to be mapped into the appropriate locations in the new mesh. This process may result in loss of precision.

Therefore, a need exists for an improved numerical method that can closely capture the effects on hydrocarbon reservoir modeling introduced by subsurface features. A need further exists for an improved method for modeling a reservoir that allows a computational mesh to remain unaltered regardless of varying geometries of subsurface features. A need exists also for a method for modeling reservoir response in a subsurface system wherein a finite element mesh is created within physical boundaries that need not honor the geometry of a subsurface feature.

SUMMARY

A computer-implemented method for modeling reservoir response in a subsurface system is provided. The subsurface system has at least one subsurface feature. Preferably, the subsurface system comprises a hydrocarbon reservoir.

In one aspect, the method includes defining physical boundaries for the subsurface system, and locating the at least one subsurface feature within the physical boundaries. The method also includes creating a finite element mesh within the physical boundaries. The finite element mesh has elements, some of which may cross the at least one subsurface feature, meaning that the elements do not intentionally honor the subsurface feature. A computer-based numerical simulation is then performed wherein the effects of the subsurface feature are recognized in the response.

The reservoir response may be, for example, pore pressure, temperature or displacement at a given location within the physical boundaries.

The numerical simulation is preferably a numerical simulator that uses an enrichment function to recognize the effects of the subsurface feature in the response. For example, the enrichment function may be a function of distance that provides the distance of a location in the reservoir under study to the subsurface feature. The enrichment function may be, for example, a jump function, a single ramp function, a dual ramp function, a double distance function, or a log function.

A method of simulating a reservoir response in a hydrocarbon reservoir is also provided. The reservoir has a subsurface feature such as a wellbore, a naturally occurring fracture, an artificially induced fracture, a high permeability streak, or an interface of two geological layers having different material properties. The reservoir response may be, for example, pore pressure or displacement.

In one aspect, the method includes creating a finite element mesh for a numerical simulator. The mesh has a plurality of elements. The method also includes locating the subsurface feature within the reservoir and across elements of the mesh. The method further includes running the numerical simulator to create a solution for the reservoir response at a given location. Preferably, the method also comprises providing an enrichment function in the numerical simulator to capture the effects of the subsurface feature on the solution of the reservoir response caused by the subsurface features. The enrichment function may be, for example, a jump function, a ramp function or a log function.

The method may include the additional steps of:
running the numerical simulator a first time without a subsurface feature to determine a primary value for a reservoir solution;
running the numerical simulator a second time with at least one subsurface feature to determine a second value for the reservoir solution; and
comparing the second value for the reservoir solution to the primary value for the reservoir solution, thereby establishing a first completion efficiency.

The method may then include the additional steps of:
running the numerical simulator a third time with at least two subsurface features to determine a third value for the reservoir solution;
comparing the third value for the reservoir solution to the primary value for the reservoir solution, thereby establishing a second completion efficiency; and
comparing the second completion efficiency with the first completion efficiency to determine the better completion efficiency.

A method for determining an optimum hydrocarbon reservoir operation for a hydrocarbon reservoir is also provided. The reservoir has at least one subsurface feature such as a fault, a natural fracture, an artificial fracture, an interlaminar layer or a wellbore. In one aspect, the method comprises locating the at least one subsurface feature within the reservoir, and creating a finite element mesh within the reservoir. The finite element mesh has elements that cross the at least one subsurface feature such that the subsurface feature intersects elements in the mesh.

The method also includes providing a computer-based numerical simulation tool wherein the effects of the subsurface feature are recognized in the reservoir response by use of an enrichment function; operating the numerical simulation tool at a first set of parameters to determine a first reservoir response value; operating the numerical simulation tool at a second set of parameters to determine a second reservoir response value; and comparing the first reservoir response value with the second reservoir response value to make an engineering judgment about optimum hydrocarbon reservoir operation.

The reservoir response may be pore pressure or displacement at a given location within the reservoir. In one aspect, the enrichment function is a signed distance function that provides the distance of a location in the reservoir under study to the subsurface feature.

BRIEF DESCRIPTION OF THE DRAWINGS

So that the manner in which the features of the present invention can be better understood, certain drawings and charts are appended hereto. It is to be noted, however, that the drawings illustrate only selected embodiments of the inventions and are therefore not to be considered limiting of scope, for the inventions may admit to other equally effective embodiments and applications.

In FIG. 7(a), no slippage along the fault has occurred.

In FIG. 7(b), shear slipping has taken place along the direction of the plane of the fault as a result of production. This has resulted in displacement of the formation.

FIG. 8(a) is a screenshot showing the reservoir prior to fluid injection procedures. No fracture has yet been formed.

FIG. 8(b) is a screenshot showing the reservoir after fluid injection has begun. Here, fracture formation is beginning to occur as a result of fluid injection procedures.

FIG. 8(c) is an enlarged view of the reservoir from FIG. 8(b). The early fracture formation can be more clearly seen through the radial cutout.

FIG. 8(d) is another enlarged view of the reservoir following further propagation of the fracture. Here the fracture has widened and has also extended deeper into the reservoir.

FIG. 8(e) is another screenshot of the reservoir following further injection of fluids. The fracture has propagated even deeper into the reservoir.

FIG. 9(a) shows a wellbore with gradient bands using a traditional mesh extending radially from the wellbore.

FIG. 9(b) shows a wellbore with radial gradient bands but using a coarse scale mesh that intersects the wellbore.

FIG. 12(a) shows the simulated reservoir having been meshed with traditional fine scale grid lines. The grid lines honor a subsurface feature within the physical boundaries of the simulated reservoir.

FIG. 12(b) shows the simulated reservoir having been meshed with coarse scale grid lines. The grid lines need not honor a subsurface feature within the physical boundaries of the simulated reservoir.

DETAILED DESCRIPTION OF CERTAIN EMBODIMENTS

Definitions

Figure 1:
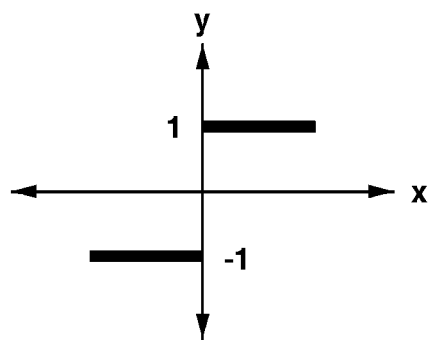
FIG. 1 illustrates a jump function as may be used in finite element modeling as an enrichment function in certain reservoir modeling methods herein.

"Strain" means a measure of the extent to which a body of material is deformed and/or distorted when it is subjected to a stress-inducing force. "Stress-Inducing Force" refers to an action of at least one force, load and/or constraint on a body of material that tends to strain the body. Examples of the body's deformation or distortion can include, without limitation, changes in the body's length (e.g., linear strain), volume (e.g., bulk strain) and/or a lateral displacement between two substantially parallel planes of material within the body (e.g., shear strain).

"Stress" is a measure of inter-particle forces arising within a body of material resisting deformation and/or distortion, in response to a stress-inducing force applied to the body, as particles within the body of material work to resist separation, compression and/or sliding.

"Principal Stress" means any one of three inherent normal stresses, each perpendicular to the other, in a predetermined coordinate system where the three corresponding shear stresses are equal to zero. Generally, though not always, one of the principal stresses is substantially vertical in a formation, while the two remaining principal stresses are substantially horizontal. While there is no requirement for the principal stresses to be vertical or horizontal, for ease of discussion herein, the three principal stresses, may be referred to as principal vertical stress, $\sigma_{vert}$, greater principal horizontal stress, $\sigma_{horiz-1}$, and lesser principal horizontal stress, $\sigma_{horiz-2}$.

"Poisson Ratio," or "ν" means, for a substantially elastic body of material when placed under a substantially uniaxial stress, the ratio of the strain normal to the uniaxial stress to the strain parallel to the uniaxial stress.

"Elastic stress to-strain modulus" means a ratio of stress applied to a body versus the strain produced. Elastic stress-to-strain moduli include, without limitation, Young's modulus, ("E"), bulk modulus ("K"), and shear modulus ("G").

"Young's Modulus" ("E") means, for a substantially elastic body of material when placed under a substantially uniaxial stress less than the material's yield strength, whether a tension or compression stress, the ratio of the uniaxial stress, acting to change the body's length (parallel to the stress), to the fractional change in the body's length.

"Elastic" means a body of material capable of sustaining deformation and/or distortion without permanent loss of size or shape in response to a stress-inducing force, whether the body's response is linear elastic or non-linear elastic.

"Yield Strength" means the stress value at which deformation resulting from a stress-inducing force becomes permanent. At that stress value, a body of material, which previously exhibited an elastic response, will begin to exhibit a plastic response to the stress-inducing force.

"Subsurface" means beneath the top surface of any mass of land at any elevation or over a range of elevations, whether above, below or at sea level, and/or beneath the floor surface of any mass of water, whether above, below or at sea level.

The term "subsurface feature" refers to any area where a reservoir condition experiences either sudden or very rapid change. Where the subsurface feature is an interface interior to the reservoir, it may be referred to as a discontinuity. Nonlimiting examples include artificially induced fractures, wormholes, naturally occurring fractures and fault planes. A subsurface feature may also include conditions at the physical boundaries of the reservoir. Further, a subsurface feature may be a moving boundary such as an injection-induced fracture or a wellbore interface that is losing sand or other solid material.

"Physical boundaries" refers to either actually geometric or volumetric boundaries of a reservoir, or boundaries prescribed for a reservoir through a gridding or numerical simulation software.

"Formation" means a subsurface region, regardless of size, comprising an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation may contain numerous geologic strata of different ages, textures and mineralogic compositions. A formation can refer to a single set of related geologic strata of a specific rock type, or to a whole set of geologic strata of different rock types that contribute to or are encountered in, for example, without limitation, (i) the creation, generation and/or entrapment of hydrocarbons or minerals and (ii) the execution of processes used to extract hydrocarbons or minerals from the subsurface.

As used herein, the term "hydrocarbon(s)" refers to organic material with molecular structures containing carbon bonded to hydrogen. Hydrocarbons may also include other elements, such as, but not limited to, halogens, metallic elements, nitrogen, oxygen, and/or sulfur.

The term "wellbore" refers to a hole in the subsurface made by drilling or insertion of a conduit into the subsurface. A wellbore may have a substantially circular cross section, or other cross-sectional shape. As used herein, the term "well", when referring to an opening in the formation, may be used interchangeably with the term "wellbore."

The term "enrichment function" means a mathematical input that takes into account the effects of a feature on a solution field. Nonlimiting examples include a ramp function, a jump function and a log function.

A "high permeability streak" is an area within a formation having a permeability higher than the permeability of the neighboring rock. A nonlimiting example of a high permeability streak is a fracture wing having sand proppant. In this instance, the streak comprises two opposing interfaces. Another example is an elongated subsurface cavity.

A "signed distance function" means a function of location relative to a subsurface feature.

Description of Selected Specific Embodiments

The present invention relates generally to the simulation of subsurface activities associated with hydrocarbon recovery. Such activities may include both the production of fluids from and the injection of fluids into a reservoir. The present technique provides an improved approach to simulate such activities without the necessity of constructing computational meshes honoring subsurface features.

Under the present methods, information about how subsurface features may affect reservoir behavior is inserted into a numerical model which has a computational mesh constructed without respect to the location of subsurface features. The numerical model may be any applicable computational scheme for reservoir modeling such as the finite element method.

One process of accounting for subsurface features in the modeling method is implemented based on a partition of unity theory. This approach is used for features that reside within the domain. A partition of unity is a collection of continuous functions $\{(\phi: X \rightarrow [0, 1]\}$ such that $$\sum_i \varphi_i(x) = 1 \text{ for all } x \in \Omega \tag{1}$$

wherein: $\phi_i(x)$ is the i-th continuous function;
x defines a location in the domain, and
$\Omega$ defines a space domain.

The objective of Partition of Unity Method (PUM) is to more precisely simulate behaviors which are not capable of being effectively captured by traditional finite element methods. Texts discussing PUM as well as numerical methods derived from PUM include J. M. Melenk and I. Babuska, *The Partition of Unity Finite Element Method: Basic Theory and Applications*, Computer Methods in Applied Mechanics and Engineering, Vol. 139, pp. 289-314, (1996); and I. Babuska and J. M. Melenk, *The Partition of Unity Method*, International Journal for Numerical Methods in Engineering, Vol. 40, pp. 727-758 (1997). In applying this method, such behaviors are usually expressed by a series of mathematical functions $\{v_i\}$. The approximation under the PUM is constructed as:

$$u_{approx}^{PUM} = \sum_{i=1,n} \phi_i v_i \tag{2}$$

An approximation using the PUM may be used to enrich traditional finite element methods. As applied in the current context, the PUM allows a finite element analysis to perform in a manner that is as accurate for rough or discontinuous cases as it does for smooth or continuous applications.

In the traditional finite element methods, solutions are sought at nodal locations along element edges or within elements. To approximate a value at a certain location within an element, the following equation is used:

$$u_{approx}^{PUM}(x) = \sum_{i=1,N^E} N_i(x) u_i \tag{3}$$

wherein: $N^E$ is the number of nodes of an element;
$N_i(x)$ is a shape function associated with node i,
$u_i$ is the solution at node i.

Equation (3) is for use in the case when u(x) is a scalar function of location. Where the unknown value is a vector, u(x) and $u_i$ in equation (3) are vectorized.

In finite element analysis, the elements are connected at nodes placed along the edges forming the elements. The nodes are shown as "i" in the above equation (3). Each node i has at least one unknown variable. The number of unknown field variables at a node represents the number of degrees of freedom at that node.

In finite element analysis, a group of functions is chosen to assist in the interpolation process. In the above equation (3), the function is indicated at "$N_i$". Because these functions are based upon the geometry or shape of the elements selected, an interpolation function may also be called a shape function. In most cases, a polynomial interpolation function is used.

An example of a shape function for node "1" of a cubic element is:

$$N(\xi, \eta, \zeta) = (1-\xi)(1-\beta)(1-\zeta) \tag{4}$$

wherein: $\xi$, $\eta$ and $\zeta$ are the local coordinates of a point x.

Once the geometry or shape of the elements is decided, the field variables in the elements are approximated. These are approximated in terms of the values at the nodes. $u_i$ is indicated above as a set of unknown parameters. Stated more specifically, for reservoir modeling, $u_i$ is the pressure or other reservoir response value at a given node i.

In accordance with the present modeling approach, enrichment functions are provided. The enrichment function is used to account for the effects of subsurface features on the solution for a reservoir response. The effects of the subsurface feature on the solution may be characterized by function $\{\Phi\}$. In this instance, the traditional finite element approximation as shown in equation (3) is modified to accommodate for the effects of the subsurface feature $\{\Phi_j\}$ as shown below in equation (5):

$$u_{approx}^{EFEM}(x) = \sum_{i=1,N^E} N_i(x) u_i + \sum_{i=1,N^{enr}} \left( N_i(x) \sum_{j=1,N^{enr}} a_{ij}(\Phi_j(x) - \Phi_j(x_i)) \right) \tag{5}$$

or optionally in equation (6):

$$u_{approx}^{EFEM}(x) = \sum_{i=1,N^E} N_i(x) u_i + \sum_{i=1,N^{enr}} \left( N_i(x) \sum_{j=1,N^{NE}} a_{ij} \Phi_j(x) \right) \tag{6}$$

wherein: u(x) is the function for solving the unknown value or reservoir response sought to be quantified,
$N^{NE}$ is the number of nodes that will be enriched,
$N^{enr}$ is the number of enrichment functions to be incorporated, $\Phi_j$ is the i-th enrichment function, $a_{ij}$ is a set of unknown parameters associated with the enrichment function $\Phi_j$ at node j, and $\Phi_j(x_i)$ is value of enrichment function $\Phi_j$ at node i, which is located at location $x_i$.

In equations (5) and (6), x is any point in the reservoir domain that is being examined. The point x may be either two or three dimensional.

u(x) is the unknown value being approximated. For reservoir modeling, the value is a reservoir response such as pore pressure, pressure flux, temperature, temperature flux or displacement.

$$\sum_{i=1,N^E}$$

means that the sum of the equation from i=1 to $N_E$ is being calculated. The summation notation for $N_E$=8 and $N^{NE}$=8 may be expanded as follows:

$$u_{approx}^{EFEM}(x) = N_1(x)u_1 + a_{11} N_1(x)\Phi_1(x) + \quad (7)$$

$$N_2(x)u_2 + a_{12} N_2(x)\Phi_2(x) +$$

$$N_8(x)u_8 + a_{18} N_{8l(x)} \Phi_8(x).$$

As noted, $\Phi$ indicates the enriched function. More specifically for the equation (7), $\Phi_i$ is the enriched function at node i that is, nodes 1 through 8.

The enrichment function may be one of several mathematical functions, depending on the nature of the subsurface feature and the reservoir response sought to be quantified. Table 1 provides a list of mathematical functions associated with the various subsurface features.

functions include a jump function, a ramp function, a pair of ramp functions, and a log function.

As an example, a jump function may be used to take into account the presence of a sealing fault. This is true whether the reservoir response under evaluation is pressure or a geomechanical value. Jump functions are sometimes referred to as Heaviside functions or step functions. Jump functions are preferably used in the methods herein when the subsurface feature creates a strong discontinuity in reservoir response values. In other words, a jump function is any function that has a strong discontinuity behavior.

FIG. 1 presents a Cartesian graph illustrating one embodiment of a jump function H(x) as the enrichment function. The jump function of FIG. 1 is defined as:

$$H(x) = \begin{cases} -1 : x < 0 \\ 1 : x >= 0 \end{cases} \quad (8)$$

In this instance, when a node is on one side of a discontinuous surface, a positive value "1" is assigned. When a node is on the other side of the discontinuous surface, a negative value "−1" is assigned.

It is understood that the above example in equation (8) is merely illustrative. In general, H(x) may have a first value for some range of x, and H(x) may have a second value outside the range of x. Changing "signs" is a convenient way of modeling the jump function.

It has been determined that one can compound a signed distance function $f_{dist}$ with the jump function H(x) to construct an enrichment function $\Phi(x)$ for numerical simulation. The jump function can be used to simulate the effect of a strong discontinuity on the solution field. A "signed distance function" means a function of location. The location reference "x" means a spatial location (x, y, z). The signed distance

TABLE 1

Correlation of Enrichment Function to Subsurface Feature

| Subsurface Feature | Physics | |
|---|---|---|
| | Pore Pressure | Geomechanics |
| Fault | Jump Function | JumpFunction |
| Natural Fracture | Dual Ramp Function | JumpFunction |
| Artifical Fracture in Hard Rock | Dual Ramp Function | JumpFunction |
| Fluidized Incavation in Soft Rock | Jump Function | JumpFunction |
| Interlaminar Layer | Ramp Function (if both layers are permeable) | Ramp Function (if treated as bound together) |
| | Jump Function (if one of the layers is impermeable) | Jump Function (if the layers are allowed to have shear slip) |
| Wormhole, Wellbore, or Perforation — Treated as a One-Dimensional Curve | Log Function | N/A (because well string would be too small to have an effect on the geomechanics) |
| Wormhole, Wellbore, or Perforation — Treated as a Surface | Jump Function | Jump Function |
| Grain Boundary in Pore Scale Modeling | Jump Function | JumpFunction |

As can be seen from Table 1, various enrichment functions can be used, depending on the application. The enrichment function returns the signed distance of the location (x, y, z) to the subsurface feature. The sign is determined by which side the location is with respect to the subsurface feature. This compounded function may be expressed by:

$$\phi(x) = H(f_{dist}(x)) \qquad (9)$$

As noted, another type of enrichment function that may be used herein is a ramp function. Ramp functions are preferably used in the methods herein when the subsurface feature creates only a weak discontinuity in reservoir response values. For example, when the subsurface feature is an interlaminar layer wherein the interfacing layers are both permeable and the reservoir response under evaluation is pressure, a single ramp function may be used. Similarly, and as shown in Table 1, when the subsurface feature is an interlaminar layer wherein the layers are bound together, and the reservoir response is a geomechanical value, a single ramp function may be used.

Figure 2A:
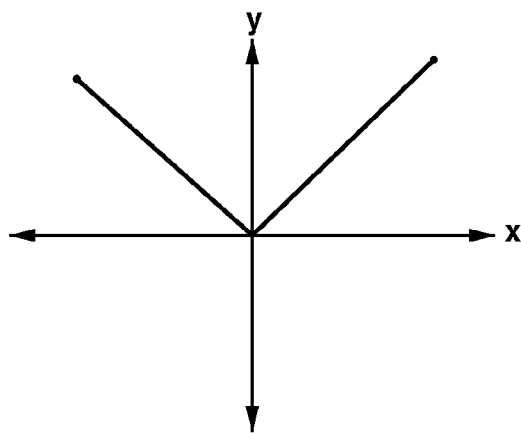
FIG. 2(a) is Cartesian coordinate representing a ramp function as may be used in certain reservoir modeling methods herein, in a first embodiment.
Figure 2B:
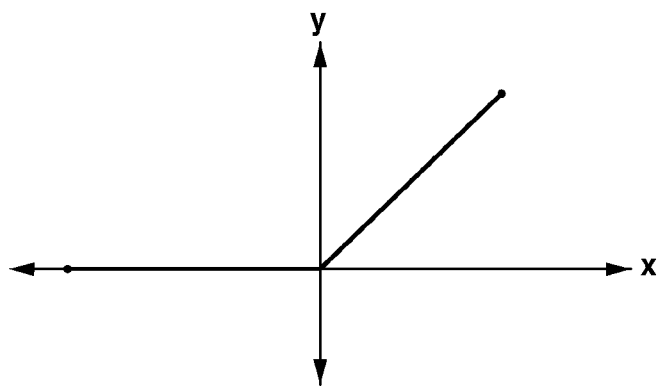
FIG. 2(b) is a Cartesian coordinate representing a ramp function as may be used in certain reservoir modeling methods herein, in a second embodiment.

FIGS. 2(a) and 2(b) present Cartesian graphs illustrating embodiments of a ramp function. In FIG. 2(a) the ramp function is defined as:

$$R(x) = |x| \qquad (10)$$

In FIG. 2(b), the ramp function is defined as:

$$R(x) = \begin{cases} 0 : x < 0 \\ x : x \geq = 0 \end{cases} \qquad (11)$$

It is understood that the equation for R(x) is merely illustrative. The ramp function R(x) may be any function defining a first continuous function over a first range of x, and a second continuous function over a second range of x. In this instance, the first continuous function and the second continuous function are continuous at a junction point, but the continuation is not smooth.

It has again been observed that one can compound a signed distance function $f_{dist}$ with the ramp function R(x) to construct an enrichment function $\Phi(x)$. The enrichment function can be used to simulate the effect of a weak discontinuity on the solution. This compounded function may be expressed by:

$$\Phi(x) = R(f_{dist}(x)) \qquad (12)$$

Another type of enrichment function that may be used herein is a log function. The log function is useful where a high gradient response is being approximated. For example, when (1) the subsurface feature is a perforation, (2) the perforation is treated as a curve in a simulation, and (3) the reservoir response under evaluation is pressure, a log function is used.

To simulate high gradient behavior, one can use a log function as the enrichment function:

$$\Phi(x) = L(f_{dist}(x)) \qquad (13)$$

where L(x) is a function composed of a logarithm function.

Regardless of the form of the enrichment function, the equation (5) described above for finite element modeling may be written in vector form:

$$u_{approx}^{EFEM}(x) = \sum_{i=1,N^E} N_i(x)u_i + \sum_{i=1,N^{enr}} (N_i(x) \sum_{j=1,N^{enr}} a_{ij} e_j (\Phi_j(x) - \Phi_j(x_i))) \qquad (14)$$

or optionally $$u_{approx}^{EFEM}(x) = \sum_{i=1,N^E} N_i(x)u_i + \sum_{i=1,N^{enr}} \left( N_i(x) \sum_{j=1,N^{NE}} a_{ij} \Phi_j(x) \right) \qquad (15)$$

wherein: u(x) is the function for solving the unknown value or reservoir response sought to be quantified,
i represents a node,
$N_E$ is the number of nodes in the element where x resides,
$N^{NE}$ is the number of enrichment functions to be incorporated,
$N^{enr}$ is the number of nodes to be enriched in the element where x resides,
$\Phi_j$ is an enrichment function at node j,
$a_{ij}$ is a set of unknown parameters associated with the enrichment function $\Phi_j$ at node j,
$\Phi_j(x_i)$ is the value of enrichment function $\Phi_j$ at node i, which is located at location $x_i$, and
$N_i$ is the shape function at node i.

If the subsurface feature is a boundary surface such as a wellbore, a perforation tunnel, or a fluidized incavation in soft rock, the effects of such a surface may be captured by using a modified jump function. The modified jump function is used in the domain integration for stiffness matrix and body force terms in a finite element method formulation. The boundary-type subsurface feature is addressed by multiplying the integrand by the jump function. In this type of jump function, one branch of the function value is vanishing, or zero, and the other one is non-vanishing. An example of applying this signed distance function is as follows:

$$\int_\Omega \nabla v \cdot K \nabla u \, d\Omega = 0$$

$$\int_\Omega \nabla v \cdot K \nabla u H(x) d\Omega = 0$$

where: $\Omega$ is the domain to be integrated;
$\nabla$ is the gradient;
· denotes the dot product;
v is a smooth weight function that satisfies the displacement boundary conditions,
K is the coefficient related to a material property,
$\nabla v$ is the gradient of displacement to be solved for;
H(x) is a jump function;
$\nabla v$ is a gradient of the function that satisfies the Dirichlet boundary conditions; and
$d\Omega$ is the derivative of the domain $\Omega$.

When compounding the jump function H(x) with a signed distance function, the location inside the boundary-type subsurface feature will attach a sign to the absolute value of distance which makes the jump function vanishing, or zero. For example, the jump function may be defined as H(x)=0 if x<0, and 1 if x≧0. The signed distance function may give a negative sign inside the boundary-type subsurface feature, and a positive sign outside the boundary-type subsurface feature.

As indicated in Table 1, the modeling methods offered herein have a number of simulation applications. In one embodiment, the modeling techniques can be used in the design and evaluation of a fractured completion. Those familiar with the art of completion engineering will understand that fractures are often artificially introduced into hydrocarbon reservoirs to facilitate the flow of fluids into the wellbore. Fractures are typically created by first cementing a casing string (or other completion tubular) at the completion depth, and then exploding charges through the casing and into the formation to create perforations. From there, hydraulic fluid is injected down through the wellbore under high pressure, through the perforations, and into the surrounding formation. In some completions, casing is not cemented all the way to total depth. This is referred to as an openhole completion. Fracturing operations may be conducted through openhole completions by injecting the hydraulic fluid into the bottom of the borehole and into the surrounding formation. In either instance, packers may be placed along the wellbore to isolate portions of the formation receiving hydraulic fluid, and proppant such as sand may be slurried with the fluid. The hydraulic fluid opens channels or fracture wings in the surrounding formation, providing enhanced recovery of formation hydrocarbons.

Figure 3:
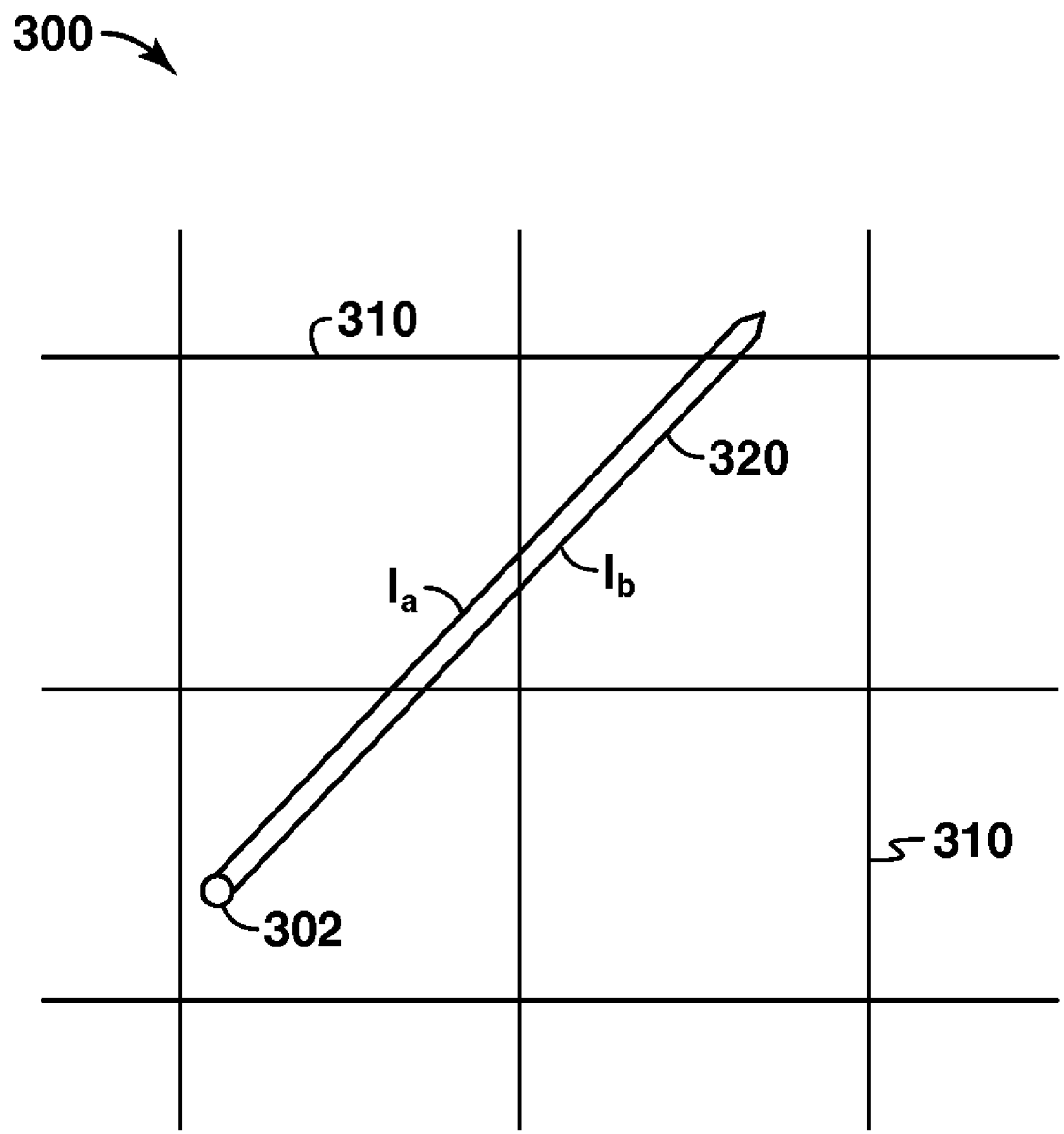
FIG. 3 is a plan view of a subsurface domain. A fracture wing is shown traversing element edges in the domain.

FIG. 3 demonstrates a plan view of a subsurface domain 300. The subsurface domain 300 represents a hydrocarbon reservoir under study. The subsurface domain 300 is discretized through a coarse finite element mesh. Element edges are marked at 310 in FIG. 3. "Coarse scale" generally means that the elements need not follow subsurface features as in the traditional techniques, referred to as "fine scale." Further, fewer elements are typically needed in coarse scale meshing. Of course, it is understood that meshing will always be a function of the size of the subsurface domain under study. For example, if a near-wellbore reservoir response is under study, the meshing will be confined to the wellbore and the reservoir immediately surrounding the wellbore. On the other hand, if large portion of a reservoir is under study, then meshing will be expanded.

In FIG. 3, a fracture wing 320 is shown within the subsurface domain 300. The fracture wing 320 is extending from a wellbore 302. The wellbore 302 is shown as a circle, as the view of FIG. 3 is essentially a top view. This means that the fracture wing 320 may be an artificially created fracture within the reservoir. However, it is understood that the fracture wing 320 may alternatively represent a naturally-occurring high permeability streak.

The fracture wing 320 is bounded by two parallel interfaces $I_a$ and $I_b$. The interfaces $I_a$ and $I_b$ respectively separate the fracture wing (or other high permeability streak) 320 from the rock defining the reservoir 300. In conventional FE modeling, the mesh gridlines 310 would have to stop at either side of the fracture wing 320. This means that new cells or "elements" would start and stop at the fracture wing 320. However, in the new modeling method the fracture wing 320 traverses the element edges 310. This provides a reduction of mesh work.

The manner in which each interface $I_a$, $I_b$ affects field parameters such as pore pressure may be characterized by dual ramp functions. Stated another way, the modeling method may be used to account for the effects of interfaces $I_a$, $I_b$ into a finite element approximation of a porous pressure field. This is true whether the subsurface feature at issue is a natural fracture or an artificial fracture in hard rock.

It can be seen in equation (16) that a pair of ramp functions is employed. The ramp functions are $\Phi^{Ia}(x)-\Phi^{Ia}(x_i)$ and $\Phi^{Ib}(x)-\Phi^{Ib}(x_i)$. These dual ramp functions account for the presence of an interface separating materials with different permeability. Together, the ramp functions account for the presence of a subsurface feature having opposing faces, that is, a subsurface feature that represents a high permeability streak such as a fracture wing.

It is noted at this point that where the reservoir response under study is a geomechanical value, the enrichment function would be a jump function. This is true whether the subsurface feature at issue is a natural fracture, an artificially formed fracture in hard rock, or a fluidized area in soft rock.

In connection with a fracturing process, it is sometimes desirable to pre-determine the number of fracture wings, the fracture orientation, the wing lengths or thicknesses for the fractures. At the design stage, these parameters may be input into a reservoir modeling program to determine the effect of various fracturing options on anticipated production. However, in the conventional finite element approach using a meshed structure, any modification to the fracture program parameters requires manually re-meshing the studied domain. This procedure demands a significant amount of resources to implement.

One benefit of the use of the double-ramp enrichment function for studying pore pressure is the quick comparison of different fracturing options. The effect of different fracture numbers or locations on pore pressure may be modeled at a given location.

In one instance, the reservoir analyst may run a numerical simulator a first time without a fracture to determine production rate, which may be derived from a pressure solution and input rock properties in accordance with Table 1. The numerical simulator may be run a second time with at least one artificially induced fracture to determine a second value for production rate. A comparison between the second value for production rate to the primary value for production rate may be made to establish a first completion efficiency.

The simulator may be run additional times using different numbers or locations of fractures. For instance, the method may include running the numerical simulator a third time with at least two artificially induced fractures to determine a third value for production rate. A comparison is then made between the third value for the production rate to the primary value for the production rate, thereby establishing a second completion efficiency. The method may then include comparing the second completion efficiency with the first completion efficiency.

Figure 4A:
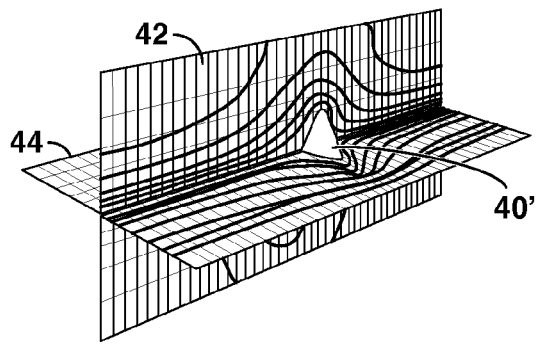
FIG. 4(a) presents a numerical simulation for a reservoir that has a single transverse fracture.
Figure 4B:
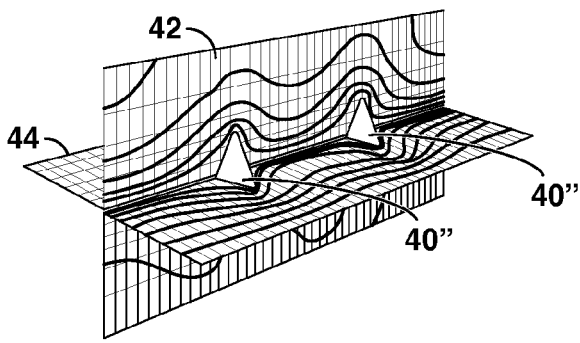
FIG. 4(b) presents a numerical simulation for a reservoir that has two transverse fractures.
Figure 4C:
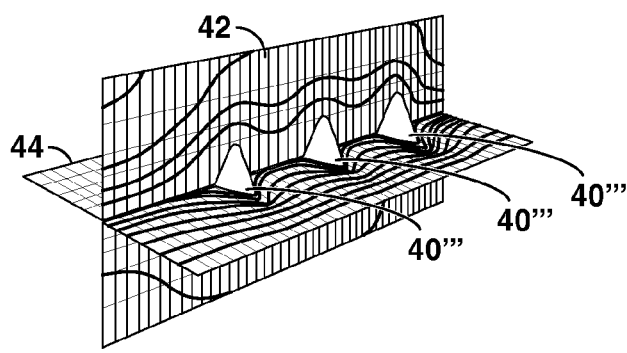
FIG. 4(c) presents a numerical simulation for a reservoir that has three transverse fractures.

FIGS. 4(a) through 4(c) demonstrate results of employing the proposed mathematical technique from equation (8) on a porous flow simulation in a reservoir. This means that a pair of ramp functions is employed in a reservoir simulator. In each figure, a reservoir is modeled using finite element meshing.

FIG. 4(a) presents a simulation 400(a) for a reservoir that has a single transverse fracture 40'. FIG. 4(b) presents a simulation 400(b) for a reservoir that has two transverse fractures 40". FIG. 4(c) presents a simulation 400(c) for a reservoir that has three transverse fractures 40'". In each figure, vertical slices are seen at 42 while horizontal slices are seen at 44. Pressure gradient lines are seen in both the vertical slices 42 and the horizontal slices 44 to show pore pressure distribution.

It can be seen from the simulations 400(a), 400(b), 400(c) that pressure gradients travel seamlessly across the fractures 40. This indicates that the reservoir modeling is able to account for pore pressure as a reservoir response notwithstanding the presence of the discontinuities presented by the artificial fractures 40', 40", 40'".

Figure 5:
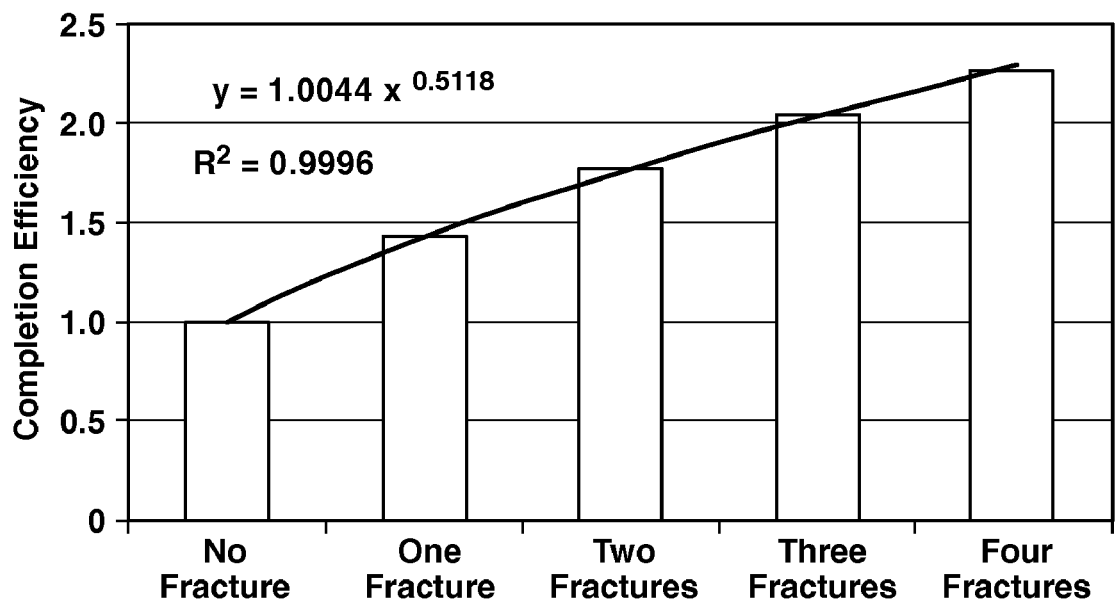
FIG. 5 is a chart comparing the efficiency of the three simulations from FIGS. 4(a), 4(b) and 4(c).

FIG. 5 is a chart showing the efficiency results from the simulations 400(a), 400(b), 400(c). Stated another way, FIG. 5 provides a completion efficiency comparison for the fracture scenarios. "Completion efficiency" is a way of measuring the utility or benefit of various completion operations or enhanced recovery options. In FIG. 5, completion efficiency is shown on the "y" axis and is plotted as a function of the number of fractures.

The completion efficiency for a reservoir having no fractures is indicated as being "1." This is the baseline for comparison. As additional fractures are assumed in the numerical simulations, the completion efficiency increases, as follows:

TABLE 2

|  | No Fractures | One Fracture | Two Fractures | Three Fractures | Four Fractures |
| --- | --- | --- | --- | --- | --- |
| Completion Efficiency | 1.0 | 1.4 | 1.7 | 2.1 | 2.2 |

It can be seen that when the reservoir is fractured a first time and a second time, the completion efficiency significantly increases. However, after the second fracture the completion efficiency levels off. A completion engineer may juxtapose this completion efficiency information with economical considerations to obtain an optimal design.

In another application, the reservoir modeling techniques using an enrichment function may be used in a situation of production-induced shear slipping. During hydrocarbon production, a reduction in in situ pore pressure can cause the reservoir to compact. Compaction, in turn, may trigger shear slipping above the compacted formation. Such slipping may occur along a fault plane, along natural fractures, or across reservoir layer interfaces. Of concern, such shear slipping may damage wells intersected by the slipping interface. In this respect, a shear plane may propagate and create strain on wellbore casings and tools, ultimately taking the wellbores out of commission. It may also cause unwanted seismic events.

Traditional approaches to simulate formation movement demand that the reservoir analyst place elements along the subsurface feature. Ideally, the analyst should also re-mesh the elements as the features move or propagate. Such processes are time consuming even for an experienced numerical analyst. Additionally, where traditional approaches are used, some subsurface features necessitate different mesh topologies for different physics. For example, natural fractures cause weak discontinuity in pore pressure across the field and suggest that the mesh be continuous. However, natural fractures cause strong discontinuity in shear components of displacement along the fracture surface, which requires the mesh to be discontinuous. To resolve this issue, multiple meshes over the same domain should be built, thereby increasing time and computational cost.

Solving problems associated with using traditional approaches may be alleviated by utilizing the presently described techniques. In the context of a shear plane, the effects of the slip surface on reservoir responses may be characterized by a jump function on the shear plane of the displacement field. The shape of the jump function was illustrated and described in connection with FIG. 1.

Where the reservoir response under study is a geomechanical value and the subsurface feature presented is a natural fault, a jump function may be used for recognizing the effects of the shear plane on a computer-simulated reservoir response. The formula for the finite element approximation using a coarse scale numerical scheme and honoring the slip surface without re-meshing may be expressed by equation (17) as follows:

$$u(x) = \sum_{i=1,N^E} N_i(x) \cdot (u_i + (a_i e_t(\Phi(x) - \Phi_i))) \quad (17)$$

wherein: u(x) is the function for solving the unknown value or reservoir response sought to be quantified,
  $u_i$ is the value of the parameter or reservoir response at a nodal point;
  i represents a node,
  $N_E$ is the number of nodes in the element where x resides,
  $N_i$ is the shape function associated with node i,
  $\Phi(x) = u(f_{dist}(x))$,
  $f_{dist}(x)$ is the enriched function,
  $a_i$ represents the unknown parameters or degrees of freedom associated with the interface,
  $e_t$ is the unit vector (vector with unit length 1) in the shear direction of the shear slipping plane, and
  $\Phi_i$ is the enriched function at node i.

Equation (17) may be used for any type of slip surface including a sealing fault, a reservoir layer interface, or even a natural fracture. Equation (18) may be modified as follows when the displacement u is vectorized:

$$u(x) = \sum_{i=1,N^E} N_i(x) u_i + \sum_{i=1,N^E} N_i(x)(a_i e_{t1} + b_i e_{t2})(\Phi(x) - \Phi(x_i))) \quad (18)$$

$e_{t1}$ and $e_{t2}$ are the unit vectors (vector with unit length 1) in the two orthogonal shear directions of the slip plane.

Figure 6:
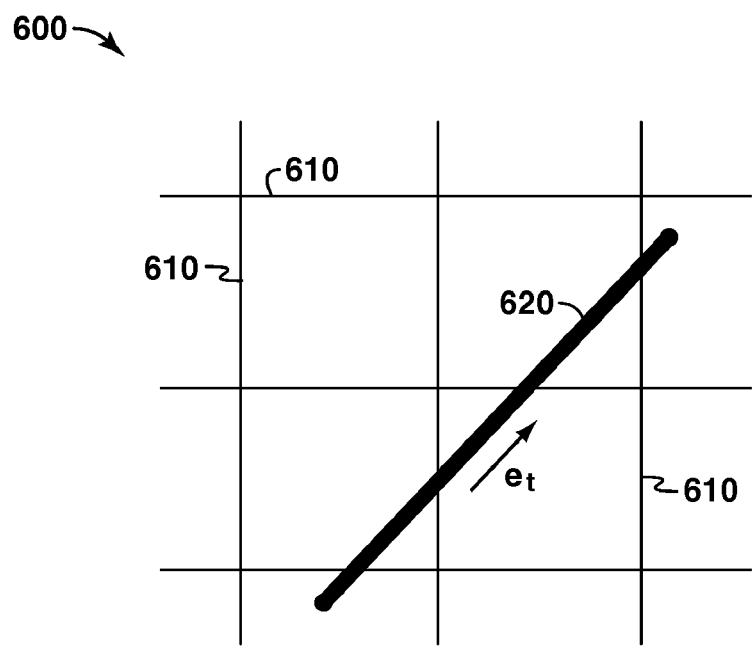
FIG. 6 is a plan view of a subsurface domain. A discontinuous surface is shown traversing element edges in the domain. The discontinuous surface is a fault line wherein shear or normal movement is taking place within a geological stratum.

FIG. 6 shows a plan view of a displacement field or subsurface domain 600. The subsurface domain 600 represents a hydrocarbon reservoir under study. The subsurface domain 600 is discretized through a coarse finite element mesh. Element edges are marked at 610 in FIG. 6.

In FIG. 6, a discontinuous surface 620 is shown within the subsurface domain 600. The discontinuous surface 620 is illustrative of any shear plane such as a sealing fault, a reservoir layer interface or a natural fracture. The discontinuous surface 620 is shown traversing mesh lines 610 in the domain 600 in a shear direction. One side of the shear direction is indicated in FIG. 6 at "$e_t$." "$e_t$." is the unit vector in the shear direction of the slip plane.

It can be seen in comparing equation (16) with equation (18) that one function (equation (16) uses a double ramp function, while the other function (equation (18)) uses a jump function. As noted in Table 1, the effect of a discontinuous surface (such as surfaces 320 or 620) on a reservoir pressure field depends on the type of subsurface feature being addressed. When modeling a reservoir, the analyst must determine what type of enrichment function is appropriate for the analysis. If a geomechanical value is under study, then a jump function is used to account for discontinuous surfaces 320 and 620. However, if pore pressure is under study, where opposing interfaces are presented as in the case of the high permeability streak 320, dual ramp functions are selected, but when a single interface such as plane 620 is presented, a single jump function is used.

Another approach to simulate shear slipping is to enrich the displacement vector as follows:

$$u(x) = \sum_{i=1,N^E} N_i(x) u_i + \sum_{i=1,N^E} N_i(x) a_i (\Phi(x) - \Phi_i(x_i)) \quad (19)$$

where: a is the enriched degree of freedom.
In this instance, a is vectorized. The non-penetration condition (known as a contact condition) is enforced by penalty methods. The contact condition is discussed in P. Wiggers, *Computational Contact Mechanics*, Ch. 5, *Boundary Value Problem and Weak Form*, pp. 93-134, John Wiley & Sons, Ltd. (2002), which is incorporated herein by reference.

Figure 7A:
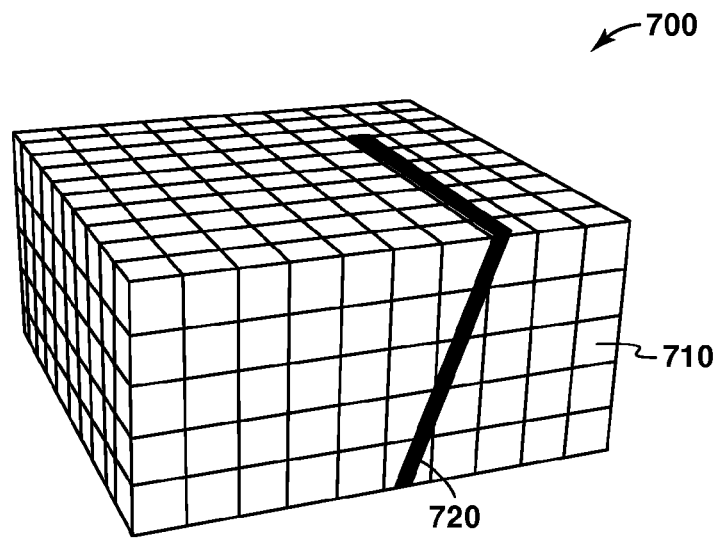
FIGS. 7(a) and 7(b) are perspective views of a hydrocarbon reservoir under study. The reservoir has a sealing fault.
Figure 7B:
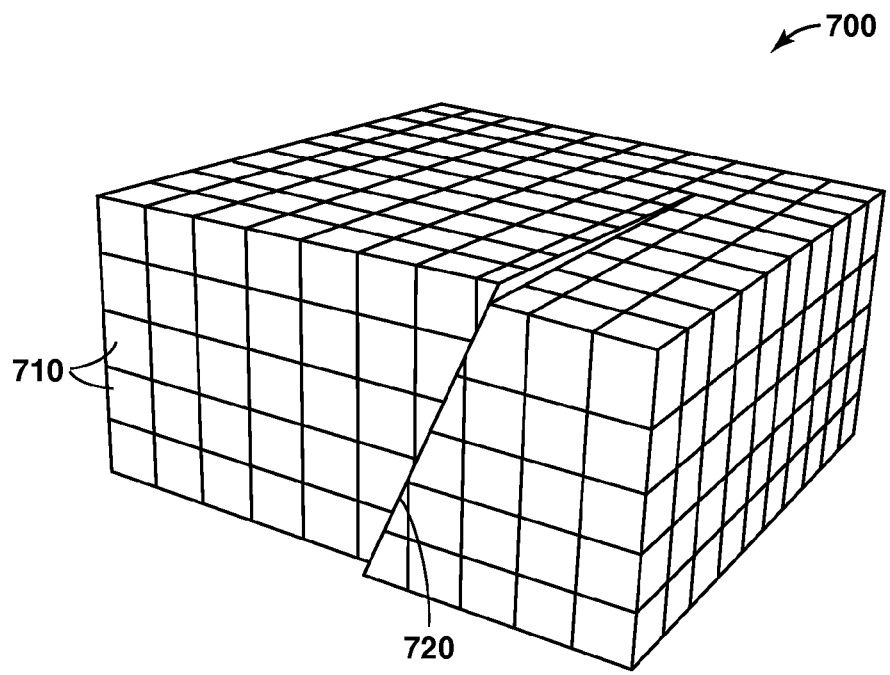

Another illustration of a subsurface feature is found in FIGS. 7(a) and 7(b). FIGS. 7(a) and 7(b) illustrate the compaction of a reservoir containing a sealing fault during production. In each of FIGS. 7(a) and 7(b), a reservoir 700 under study is shown in perspective.

The reservoir 700 has been gridded in accordance with finite element modeling. Quadrilateral mesh lines are seen at 710. The reservoir 700 has undergone faulting. A sealing fault 720 is seen in each view. According to the model, the pressure on the left face of the fault plane 720 is fixed while the pressure on the opposite face is depleted.

The view of FIG. 7(a) provides a base mesh. The gridding is coarse scale meaning that the mesh is constructed without honoring the fault plane 720. In FIG. 7(a), no displacement has yet occurred in the reservoir 700.

FIG. 7(b) shows one example of displacement results. Displacement has taken place as a result of hydrocarbon fluid production. It is seen in the reservoir 700 of FIG. 7(b) that the displacement is in the form of shearing or slippage. Displacement includes movement in the vertical or "z" direction.

Such slippage can create excessive stresses on wellbores in the field. Using the reservoir modeling methods herein, a reservoir analyst may obtain information regarding the deformation loads on wellbore casing strings in the reservoir 700 and, hence, evaluate the well operability limits. This would be a geomechanical value.

In the example of FIG. 7(b), the effect of a single interface undergoing movement along a fault plane is modeled. Where one of the layers is substantially impermeable and the reservoir parameter under study is pore pressure, the enrichment function would be a single jump function. However, if both layers are permeable and the reservoir parameter under study is pore pressure, the enrichment function would be a single ramp function. If the reservoir parameter under study is a geomechanical value, then the enrichment function would always be a single ramp function.

As noted above, in conventional finite element modeling the gridlines would have to honor the subsurface features. Thus, for example, gridlines 310 would have to stop and restart at fracture wing 320, gridlines 610 would have to stop and restart at sealing fault 620, and gridlines 720 would have to stop and restart at fault plane 720. Thus, the cells or "elements" would not jump over the discontinuous surfaces 320, 620, 720. However, in the new modeling method the discontinuous surfaces 320, 620, 720 traverse or cross the respective element edges 310, 610, 710. This provides a reduction of meshing work.

Application of the present modeling methods has been shown in the context of fractures or other high permeability streaks, sealing faults and fault planes. The modeling methods use various enrichment functions as set forth above. However, the modeling methods may be used in various additional applications.

In one embodiment, a modeling method using an enrichment function can be used in connection with evaluating the injectivity of a rock formation. Fluid injection is oftentimes used in the oil and gas industry to maintain reservoir pressure and to sweep oil towards producer wells. In this way production is enhanced. In some cases, water injection may be used as a means of disposing of produced but unwanted water. The water is typically a salt water solution, or brine. The water may include fines or waste solids, thereby forming an aqueous slurry.

Fluid injection involves the use of water injection wells. The success of any water injection well depends on maintaining an appropriate injection capacity, or "injectivity," over the planned lifetime of the development. A decline of well injectivity results in the injection of reduced volumes of water into a targeted subsurface formation. This, in turn, causes sub-optimal pressure maintenance or oil sweep to producing wells, or inadequate disposal of water into the subsurface formation.

The injectivity of a well ("II") is defined as the ratio of the injection rate to the pressure differential between the fluid in the wellbore and the "far field" reservoir pressure:

$$II = Q_{inj}/(P_{inj} - P_{res}) \quad (20)$$

wherein: $Q_{inj}$=injection rate;
$P_{inj}$=injection pressure at the wellhead; and
$P_{res}$=reservoir pressure.

The regime of operation of an injection well can determine the injectivity of an injection well. Generally, there are three possible modes of operation for injection wells: (1) matrix diffusion, (2) formation fracture, and (3) formation fluidization.

(1) Matrix injection means that the water is injected into the pore spaces of the rock formation, under pressure. Matrix injection is characterized by radial Darcy flow of the injected fluid through the pore spaces of the rock.

(2) Formation fracture injection means that the formation is fractured as a result of the injection process. This may either be done through the formation of artificial fractures using a propped fracturing fluid, or through the injection of the water itself under pressure. When the mode of injection is formation fracture, the increase in pressure from the injected fluid creates a physical parting of the rock formation. The injected fluid flows into the void created by the fracture of the rock and eventually will diffuse into the pores of the rock exposed by the fracture.

(3) The formation fluidization mode of injector operation occurs when the stress created in the rock formation by the injection operations causes inelastic deformation of the rock. When the mechanical deformation of the rock formation during injection does not follow expected linear elastic fracture mechanics ("LEFM"), the formation does not "fracture" in the classical sense. Fracture processes therefore cannot be modeled using LEFM theory. In practice, the injection pressure continues to rise, but the formation does not receive more water.

A decline in a well's injectivity ("II") results in the injection of reduced volumes of water into the target subsurface formation. In the case of enhanced recovery operations, this results in sub-optimal pressure maintenance or oil sweep to producing wells. This, in turn, can negatively impact a field's hydrocarbon recovery processes. In the case of simple water disposal, a decline in well injectivity results in an inadequate disposal of water/liquid wastes into the subsurface formation.

Geomechanical correlations can generally be made concerning the effect on injectivity. If a target subsurface rock formation can be mechanically characterized as a low compressibility, stiff, and strong shear strength rock, then as injectivity decreases, the increase in operating injection pressure is typically overcome via fracturing of the target rock formation. This fracturing phenomenon often results in a stabilization of the well's injectivity, thereby providing a relatively constant injection pressure at a constant rate of water injection.

On the other hand, if a target subsurface rock formation can be mechanically characterized as a highly compressible, uncemented, weak-shear-strength rock, then a loss of injectivity can occur, particularly at high water injection rates. This is a result of several factors such as near-wellbore rock fluidization and the creation of rock fines that plug pore spaces. If a rock is soft, that is, has low strength and high compressibility, this minimizes the chance that a fracture will form or propagate into the rock formation. Soft rock usually can only sustain a fraction of the shear and/or tensile stress as hard rock. During injection, soft rock is not capable of holding a sharp and thin fracture as can hard rock. Instead, the fracture may be compacted on the fracture faces and deformed to a more rounded shape at the fracture tip. This phenomenon may compound with material fall-off and cause the fractures in soft rock to have a much wider opening compared with hard rock. Without the "fresh" rock surface exposed by a propagating fracture, the "II" of the well can decline.

The present modeling methods may be used in the evaluation of the injectivity of both hard and soft rock. When utilizing the present technique for this type of study, the fractures in soft rock may be treated as subsurface features having variable thickness. Thus, the effect of fractures in soft rock may be represented in the same way as those in hard rock injection. Injectivity is a geomechanical value. When modeling injectivity in both hard and soft rock, the jump function is used as the enrichment function.

The present modeling methods may also be used in analyzing the effects of fracture growth in response to pore pressure. A precise evaluation of reservoir pressure in view of fluid injection rate requires that the employed computational scheme be able to capture the dynamic effects introduced by a propagating fracture. Current numerical methods either pre-define the path of the growing fracture for meshing convenience, or modify the mesh adaptively as the fracture propagates. However, in many situations the path of a fracture is not able to be predefined due to complicated geological structures, reservoir property heterogeneity, or disturbance of in situ stress caused by near-by completions or treatments, among other factors.

Using the present methods, for soft rock the manner in which an injection-induced fracture affects reservoir pressure may be simulated using a jump function. For hard rock, the manner in which an injection-induced fracture affects reservoir pressure may be simulated using dual ramp functions. This means that the flow behavior of injected fluids in a fractured space may be simulated by treating the fracture as a high-permeability streak. The dual ramp functions provide an advantageous alternative to tracking fracture growth as compared to conducting a detailed hydraulic fracture study.

An example of utilizing the present technique to simulate injection-induced fracture propagation is illustrated in FIGS. 8(a) through 8(e). FIGS. 8(a) through 8(e) show computer models for a hydrocarbon reservoir 800 under study. The reservoir is shown in perspective view, with a radial cutout 816 provided within the reservoir 800.

The reservoir 800 has been discretized through a coarse finite element mesh. Mesh lines are marked at 810. A top surface 812 of the reservoir has horizontal grid lines 810, while a front face of the reservoir 800 has vertical grid lines 814. The radial cutout 816 has been provided to indicate a zone of fluid injection into the reservoir 800.

Figure 8A:
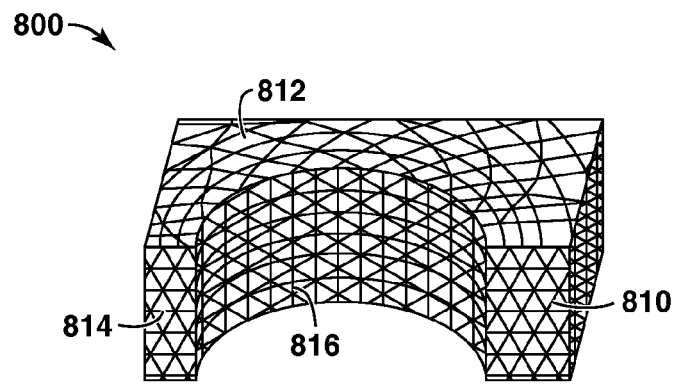
FIGS. 8(a) through 8(e) show near-wellbore computer models for a hydrocarbon reservoir under study. The reservoir is shown in perspective view, with a radial cutout provided within the reservoir.

FIG. 8(a) is a screenshot showing the reservoir 800 prior to fluid injection procedures. No fracture has yet been formed.

Figure 8B:
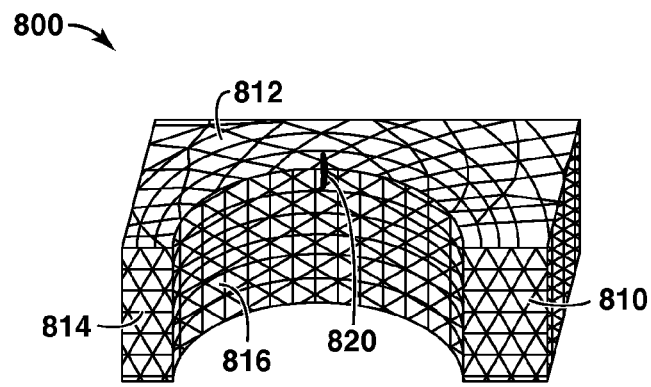

FIG. 8(b) is a screenshot showing the reservoir 800 after fluid injection is begun. Here, fracture formation is beginning to occur as a result of fluid injection procedures. A fracture is seen at 820. In this example, fractures grow when the element adjacent to a tip of the fracture exceeds about 500 psi tension. The direction of fracture growth is believed to be normal to the maximum principle stress.

Figure 8C:
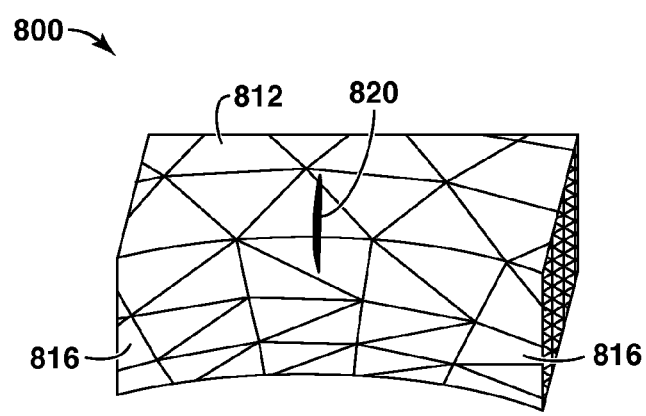

FIG. 8(c) is an enlarged view of the reservoir 800 from FIG. 8(b). The early fracture 820 formation can be more clearly seen through the radial cutout 816.

Figure 8D:
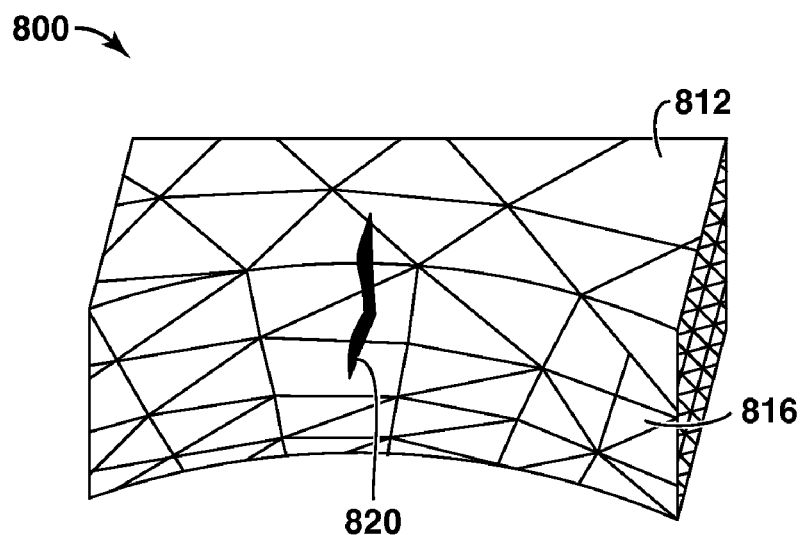

FIG. 8(d) is another enlarged view of the reservoir 800, following further propagation of the fracture 820. It can be seen that the fracture 820 has widened, and has also extended deeper into the reservoir 800 as a result of the injection of fluids under pressure.

Figure 8E:
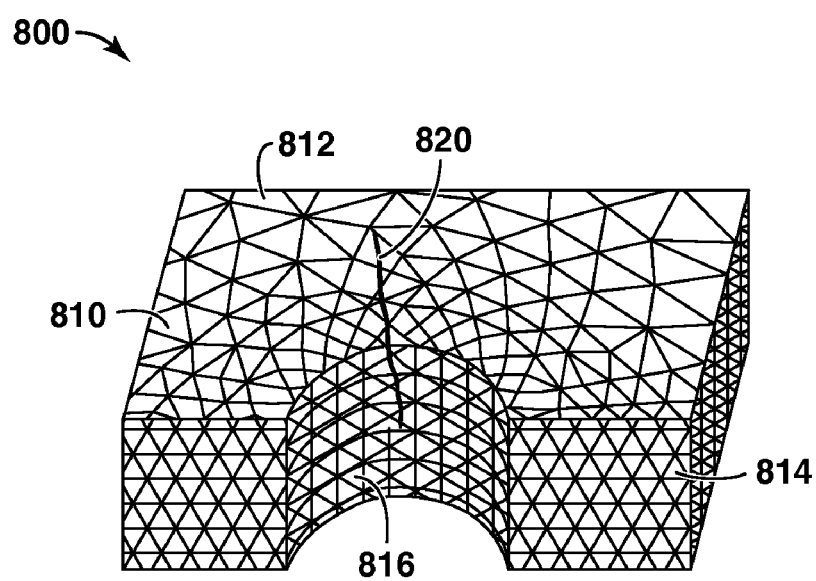

FIG. 8(e) is another screenshot of the reservoir 800 following further injection of fluids. It can be seen that the fracture 820 has propagated even more deeply into the reservoir 800.

Based on this simulation, injectivity may be obtained and used for long-term injection design and operation. The simulation may continue without re-meshing even as the fracture continues to propagate.

In addition to injectivity, a fracture propagation simulation may be used to determine potential environmental impact. For example, the analyst may determine if the growth of a fracture may penetrate to an aquifer or other sensitive zone.

It is worth noting here that the present modeling method not only leads to a reduction of meshing time, but also allows further time saving by utilizing a common mesh for all simulations. For example, the process of assembling the portion of the stiffness matrix which corresponds to the base mesh needs only to be computed once.

In one embodiment of the present methods, the subsurface feature sought to be analyzed is one or more artificially induced fractures. This simulates the injection of fluid into the subsurface formation. The enrichment function comprises a pair of ramp functions to simulate the effects of the fracture on pore pressure. The numerical simulator may be run more than once in order to acquire an optimum completion efficiency. Thus, for example, running the numerical simulator may comprise (1) running the numerical simulator a first time at a first completion configuration to acquire a first production rate value, and then (2) running the numerical simulator a second time at a second completion configuration to acquire a second pore production rate value. The second production rate value is then compared with the first production rate value, thereby establishing a ratio representing completion efficiency. This process may be repeated at subsequent completion configurations to determine an optimum completion efficiency.

In one aspect, the first completion configuration may have no fractures, while the second completion configuration may have one or more artificially induced fractures. A third completion configuration may be offered having two or more fractures, and so forth. In another aspect, the first completion configuration has at least one fracture of a first geometry, while the the second completion configuration has at least one fracture of a second different geometry. A third completion configuration may be offered having yet a third different geometry, and so forth. A completion efficiency value may be acquired by comparing second or third production rate values to the first production rate value under any of these scenarios.

An injectivity analysis may be also be conducted. The injectivity analysis is based on selected fluid injection plans. In one embodiment, an analyst may run a numerical simulator a first time using a first fluid injection plan to acquire a first geomechanical displacement value, and run the numerical simulator a second time using a second fluid injection plan to acquire a second geomechanical displacement value. The analyst may then compare the second geomechanical displacement value to the first geomechanical displacement value, thereby establishing a ratio representing an injectivity analysis. This process may be repeated for subsequent fluid injection plans to determine an optimum plan or analysis.

In one aspect, the first fluid injection plan assumes a first injection fluid having a first fluid property. At the same time, the second fluid injection plan assumes a second fluid injection fluid having a second fluid property that is different from the first fluid property. Injection fluids may include fresh water, salt water, or other suitable fluids. Both the first and second injection fluids may be brine, but have different salinities, proppants or viscosities. The first fluid injection plan may assume a first rate of injection for an injection fluid, while the second fluid injection plan may assume a second rate of injection for the injection fluid that is different from the first rate of injection. The analyst may compare geomechanical displacement values under these various scenarios in order to determine an optimum injection plan.

The numerical simulation methods using enrichment functions may be used in additional contexts. For example, the methods may be used in the prediction of sand or other solids production. Reservoir engineers will understand that during hydrocarbon production, certain areas of subsurface rock are exposed in order to produce reservoir fluids. Examples of such areas include the radial face of an open hole wellbore completion, perforation tunnels and fluid injection wormholes. During reservoir drawdown and depletion, the effective stress imposed on the exposed rock increases. This, in turn, can cause subsurface rock material to become unconsolidated or even to fail. As a result, sand or solid materials may become mixed with fluids and travel into the wellbore.

The production of sand or other solids means that material is being lost from the formation, thereby changing the geometry of the formation around the wellbore. This creates complexities in reservoir simulation as the elements in a finite element mesh have to be adjusted to honor the newly formed surface. Utilizing the present technique, the rock surface during sand or solid production may be treated as a subsurface feature. When far-wellbore meshing is employed, the effect of such features may be captured by employing a log function as the enrichment function. However, when near-wellbore meshing is employed, the effect of such features as sand production may be evaluated by employing the jump function. The obtained numerical results may provide sand rate information for sand management.

In one embodiment of the methods herein, a sand rate production analysis is conducted. The analyst may run a numerical simulator a first time using a first fluid production plan to acquire a first geomechanical displacement value, that is, the movement of sand from a wellbore face, then run the numerical simulator a second time using a second fluid production plan to acquire a second geomechanical displacement value, that is, the movement of sand from the same wellbore face. The analyst may then compare the first geomechanical displacement value to the second geomechanical displacement value. This process may be repeated for subsequent fluid production plans to determine an optimum production plan that minimizes sand production.

In one aspect, the first fluid production plan assumes a first rate of fluid production from a wellbore, and the second fluid production plan assumes a second rate of fluid production from the wellbore that is different from the first rate of fluid production. In either instance, a sand production analysis is conducted.

The reservoir modeling techniques described herein may also be used to analyze certain reservoir responses dynamically during production. During drawdown and depletion of a reservoir, certain reservoir responses such as pressure, permeability, porosity and fluid flow present a high gradient. The gradient is not a discontinuity per se, but high gradients do create difficulties in meshing.

Figure 9A:
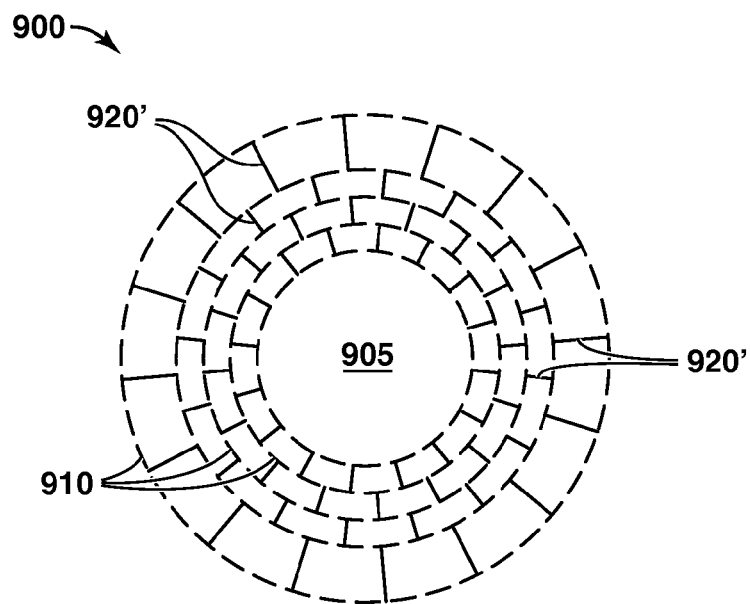
FIGS. 9(a) and 9(b) each show a wellbore with radial gradient bands. The gradient bands may be indicative of pore pressure, temperature or other reservoir properties.
Figure 9B:
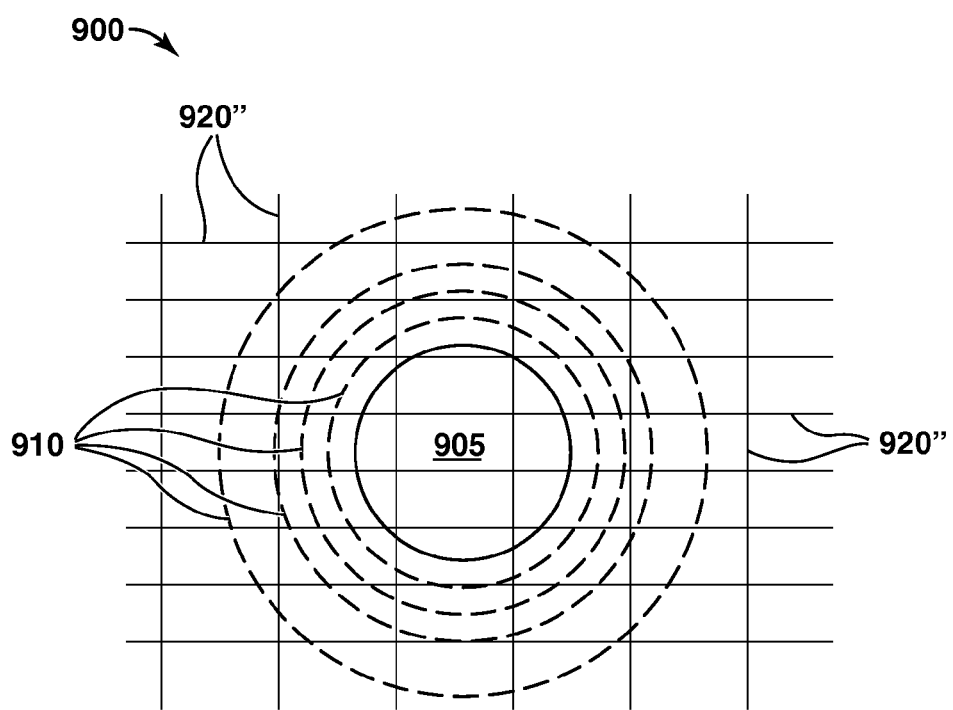

FIGS. 9(a) and 9(b) each show a subsurface reservoir 900 with a wellbore 905. Radial gradient bands 905 extend away from the wellbore 905. The gradient bands 910 may be indicative of pressure, fluid flow or other high-gradient parameter. FIG. 9(a) shows the reservoir 900 having been meshed. A traditional mesh 910' using elements that honor the gradient bands 910 is employed. As can be inferred, creating a mesh that honors the gradient bands 910 is time-intensive and tedious.

FIG. 9(b) shows the reservoir 900 having been meshed with a coarse scale mesh 910". The mesh 910" intersects the wellbore 905. In this instance, the finite element equation (9) employs a jump function as the enrichment function.

As can be seen, a number of applications exist for the modeling techniques disclosed herein. The techniques can be described in terms of methods and presented in flow charts. Examples of such flow charts are demonstrated in FIGS. 10 and 11.

Figure 10:
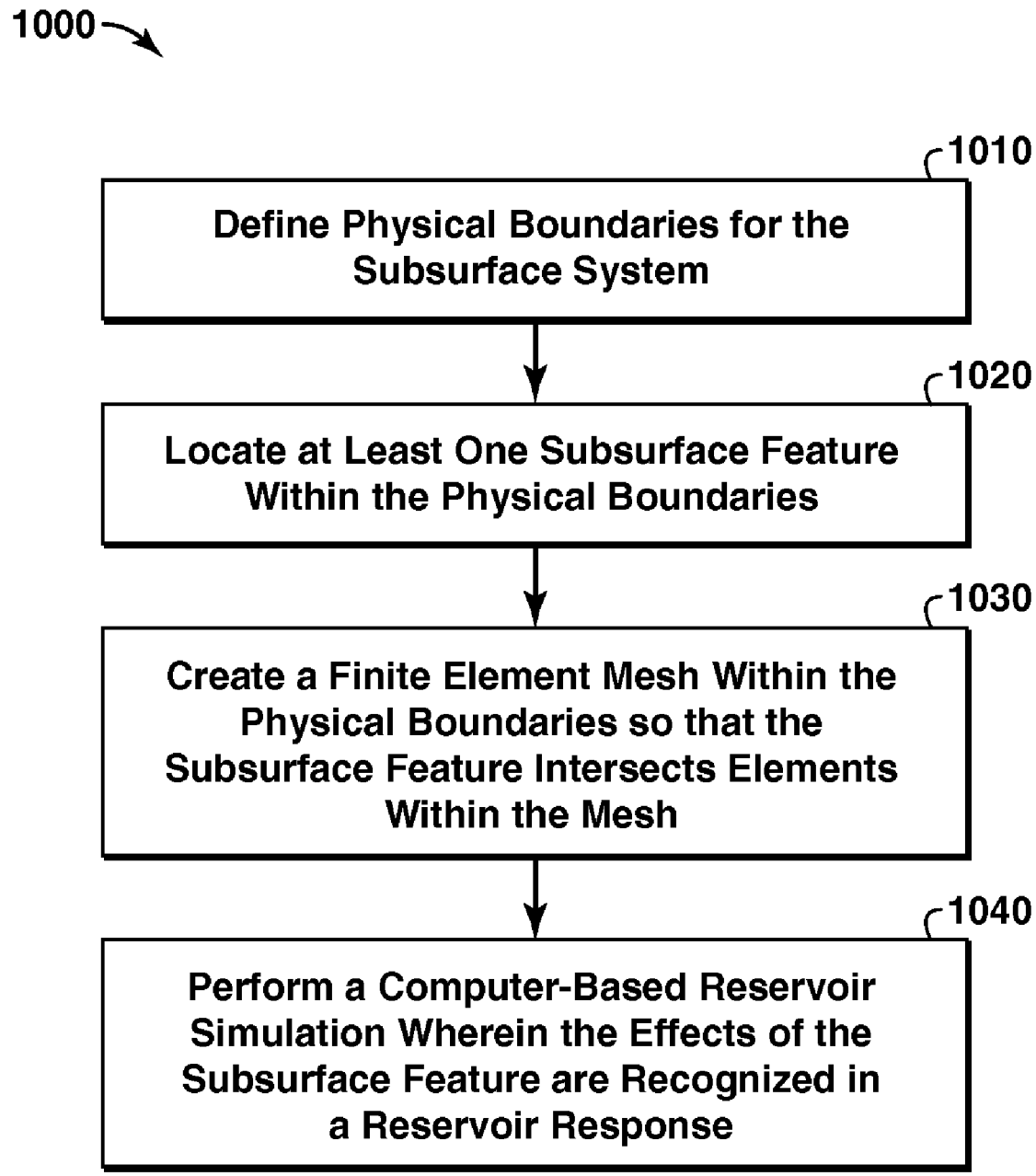
FIG. 10 provides a flow chart showing steps for performing the reservoir modeling method of the present invention, in one embodiment.

FIG. 10 provides a flow chart showing steps for performing one embodiment of the reservoir modeling methods herein. Specifically, FIG. 10 presents a computer-implemented method 1000 for modeling reservoir response in a subsurface system. Preferably, the subsurface system comprises a hydrocarbon reservoir. The subsurface system has at least one subsurface feature.

The method includes defining physical boundaries for the subsurface system. This is indicated at box 1010. The method 1000 also includes locating the at least one subsurface feature within the physical boundaries. This is shown at box 1020.

In connection with steps 1010 and 1020, the reservoir engineer or analyst establishes a geologic structure for the reservoir under study. The purpose is to create a three-dimensional, map-based model from subsurface data. In creating the geologic structure, the analyst may acquire one or more types of subsurface data. Such data may include well logging data, seismic data, or reservoir simulation data. The analyst may also acquire data from "map-derived models." Map-derived models would typically include data that exists from field-wide surveys. Such surveys may include seismic surveys and well logging data from wells around the field.

Using the subsurface data, the analyst applies computer-implemented tools to generate a map representing the geological structure of the production area. For example, the analyst will take the well log and/or seismic data and convert it into a digital representation of a subsurface area. Preferably, the data from the seismic surveys and well logging data is input into a known geological gridding program. An example of such a program is FloGrid™ offered by GeoQuest of Houston, Tex. GeoQuest is the software division of Schlumberger Information Solutions (SIS), an operating unit of Schlumberger OilField Services. The FloGrid program is described in U.S. Pat. No. 6,106,561 which is incorporated herein by reference in its entirety.

FloGrid™ is most typically used as a "pre-processor" for reservoir analysis. FloGrid™ constructs fluid-flow simulation grids for use in a reservoir simulator such as Schlumberger's ECLIPSE™ program. Reservoir data such as the porosity and permeability of the rock matrix is loaded into the program, and a simulation grid or "mesh" is created for the reservoir simulator.

The method 1000 further includes creating a finite element mesh within the physical boundaries. This is presented at box 1030. The finite element mesh is preferably constructed by using a geological gridding program such as FloGrid™. However, unlike traditional gridding approaches, in the step 1030 the finite element mesh may employ elements that cross the at least one subsurface feature such that the subsurface feature intersects element edges in the mesh.

In operation, a designated reservoir volume is divided into a large number of interconnected cells. The average permeability, porosity and other rock properties are then estimated for each cell. The process makes use of data from well logs, seismic surveys, and rock cores recovered when wells are drilled. Production from the reservoir can then be mathematically modeled by numerically solving a system of three or more nonlinear, partial differential equations describing fluid flow or other responses in the reservoir.

The process of gridding the reservoir preferably includes establishing boundary conditions at the outer edges of the simulated reservoir or domain. Boundary conditions for a hydrocarbon reservoir simulation may include the formation pressure and temperature history. The boundaries have known (or approximated) pore pressure values and geomechanical properties. The pore pressure and geomechanical values at the boundaries represent the "boundary conditions."

A computer-based numerical simulation is then performed. This is represented at box 1040. Step 1040 is performed using a computer-based numerical simulator that creates a mathematical model of a reservoir. The simulator is generically referred to as a "solver." A solver is a program that is able to solve the governing equations of interest. In geomechanics, the solver finds the solution that satisfies force equilibrium, compatibility and constitutive laws. In one aspect, the program is an available geomechanics software program such as ABAQUS™.

It is noted that most commercial reservoir flow simulators such as ECLIPSE™ only predict pressure and temperature changes within the reservoir. Such simulators lack the capability to solve for earth stress changes within and outside the reservoir. However, a separate solver such as ABAQUS™ allows the simulator to solve for the earth stress changes. These may represent, for example, a compaction strain ($\epsilon_{3-3}$) and out-of-plane shear strains ($\gamma_{1-3}$, $\gamma_{2-3}$).

The purpose for creating the finite element mesh 1030 and running the simulation 1040 in the solver is to determine reservoir responses. An example of reservoir response is the determination of geomechanical displacement, meaning movement of the rock matrix within the reservoir under study. For instance, displacement may be determined in response to changes in fluid pressure. Alternatively or in addition, movement of the rock matrix within the reservoir in response to changes in temperature may be determined. Reservoir response may also represent pore pressure itself.

Finite element analysis allows the analyst to determine the response of the "elements" to changes in the subsurface system. The mathematical model describes how each point or node responds for a given initialized state. In order to meet this purpose, the variables are initialized at various points within the reservoir. These include pore pressure and, optionally, temperature. In practice, information concerning pore pressure history and temperature history inside the reservoir is acquired. In accordance with the method 1000, the effects of the subsurface feature are recognized in the reservoir response. The reservoir response may be, for example, pore pressure, temperature or displacement at a given location within the physical boundaries.

In connection with the modeling method, rock material properties may be input into the elements of the finite element mesh as well. A rock material property refers to the constitution or makeup of the rock as well as its elasticity, and other features. A variety of tools may be used to acquire information concerning rock material properties. One source of data is core test data. Core test data refers to data taken from core samples. This may include rock lithology, porosity, and permeability. Various tests may be run on core samples in order to acquire this information. Core samples are considered the most useful source of rock data since they provide tangible and physical information concerning the make-up of subsurface rock formations at given depths.

Loading tests may also be performed in order to determine the rock's elastic properties. Typical tests include cyclic conventional geomechanics tests, uniaxial tests, or tri-axial tests. The tests may be performed on the core samples in both drained and un-drained conditions, that is, in both dry and saturated conditions. For example, a sample may be taken to failure under load to determine failure properties so as to map the rock in a Mohr Coulomb or Drucker—Prager analysis.

Such analyses may provide Young's modulus, Poisson's ratio, Lame' constants, and other rock properties that may be calculated according to formulae known by those skilled in the art of geomechanics. Other "critical state" models such as the Cam-clay model are known and may also be used. In any instance, the rock material/property model may be constructed using either elastic or elastoplastic models based on the analyst's judgment.

In practice, failure points are determined by breaking core samples in compression under different confining pressures. The uniaxial and tri-axial compression laboratory test procedures and calculations used to define the failure line in a Mohr-Coulomb analysis are known to those of ordinary skill in the art of geomechanics. When considering porous rocks with an internal pore fluid under pressure, the stresses correspond to "effective stresses." The "effective stress" on a porous rock is the normal total stress minus the pore fluid pressure. The concept of "effective stress" and its use is also known to those skilled in the art.

Well log data is also used to assess rock material properties. Data derived from well logs may inform as to both rock makeup and elastic properties. For example, gamma ray logs and density logs are useful in determining the amount of shale in a rock, which infers the presence of clay. Sonic logs can be used to calculate elastic properties. Porosity logs may also be used for porosity determinations.

Figure 11:
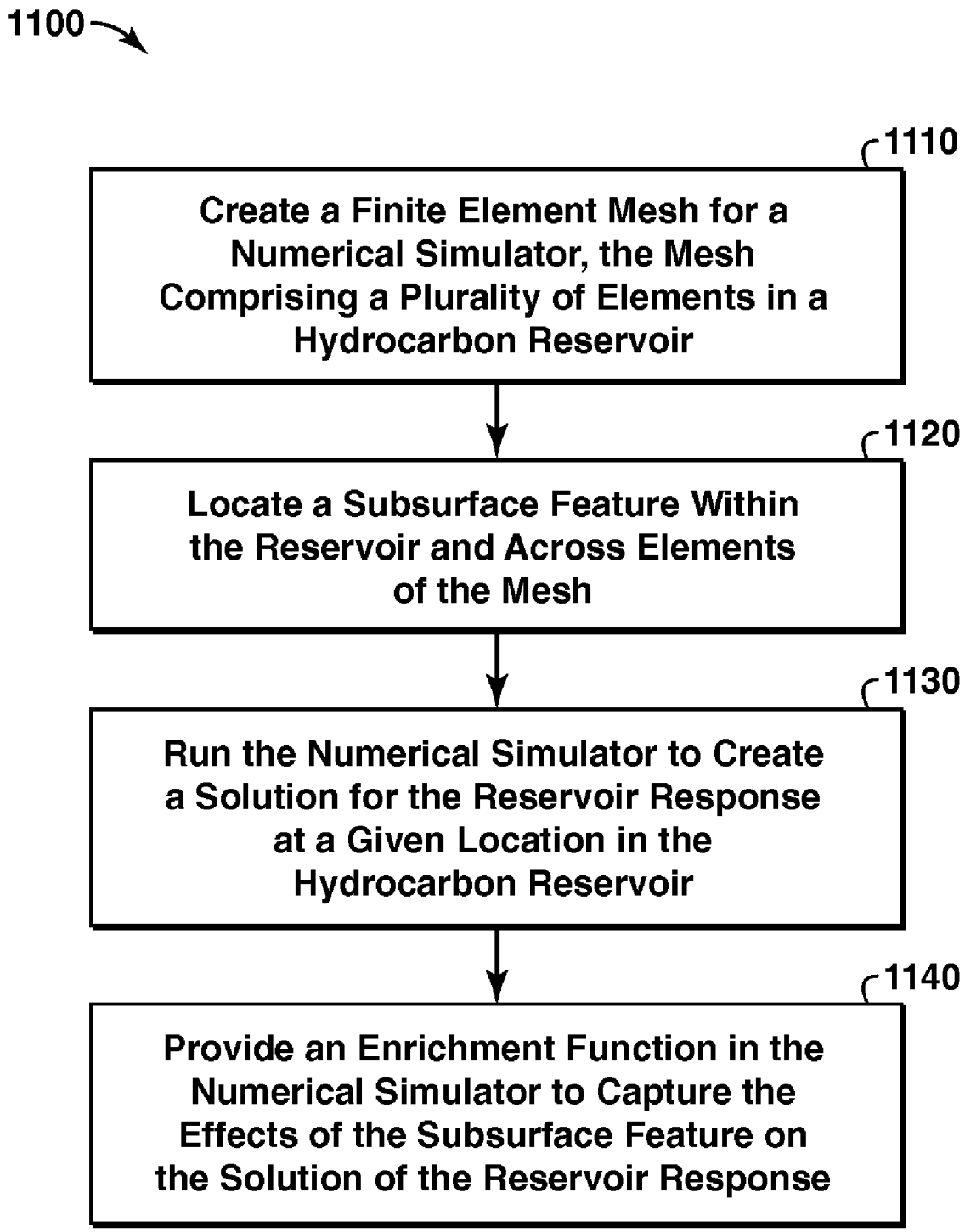
FIG. 11 presents a flow chart showing steps for performing the reservoir modeling method of the present invention, in an alternate embodiment.

FIG. 11 presents a flow chart showing steps for performing the reservoir modeling method of the present invention, in an alternate embodiment, again using a numerical simulator. Specifically, a method 1100 of simulating a reservoir response in a hydrocarbon reservoir is provided. The reservoir has a subsurface feature such as a wellbore, a naturally occurring fracture, an artificially induced fracture, a high permeability streak, or an interface of two geological layers having different material properties.

The method 1100 includes creating a finite element mesh for the numerical simulator. This is shown at box 1110. The mesh has a plurality of elements.

The method also includes locating the subsurface feature within the reservoir and across elements of the mesh. This is provided at box 1120.

The method further includes running the numerical simulator to create a solution for the reservoir response at a given location. This is indicated at box 1130.

Preferably, the method also comprises providing an enrichment function in the numerical simulator to capture the effects of the subsurface feature on the solution of the reservoir response. This is represented at box 1140. The enrichment function may be, for example, a jump function, a ramp function, a dual ramp function, or a log function.

Figure 12A:
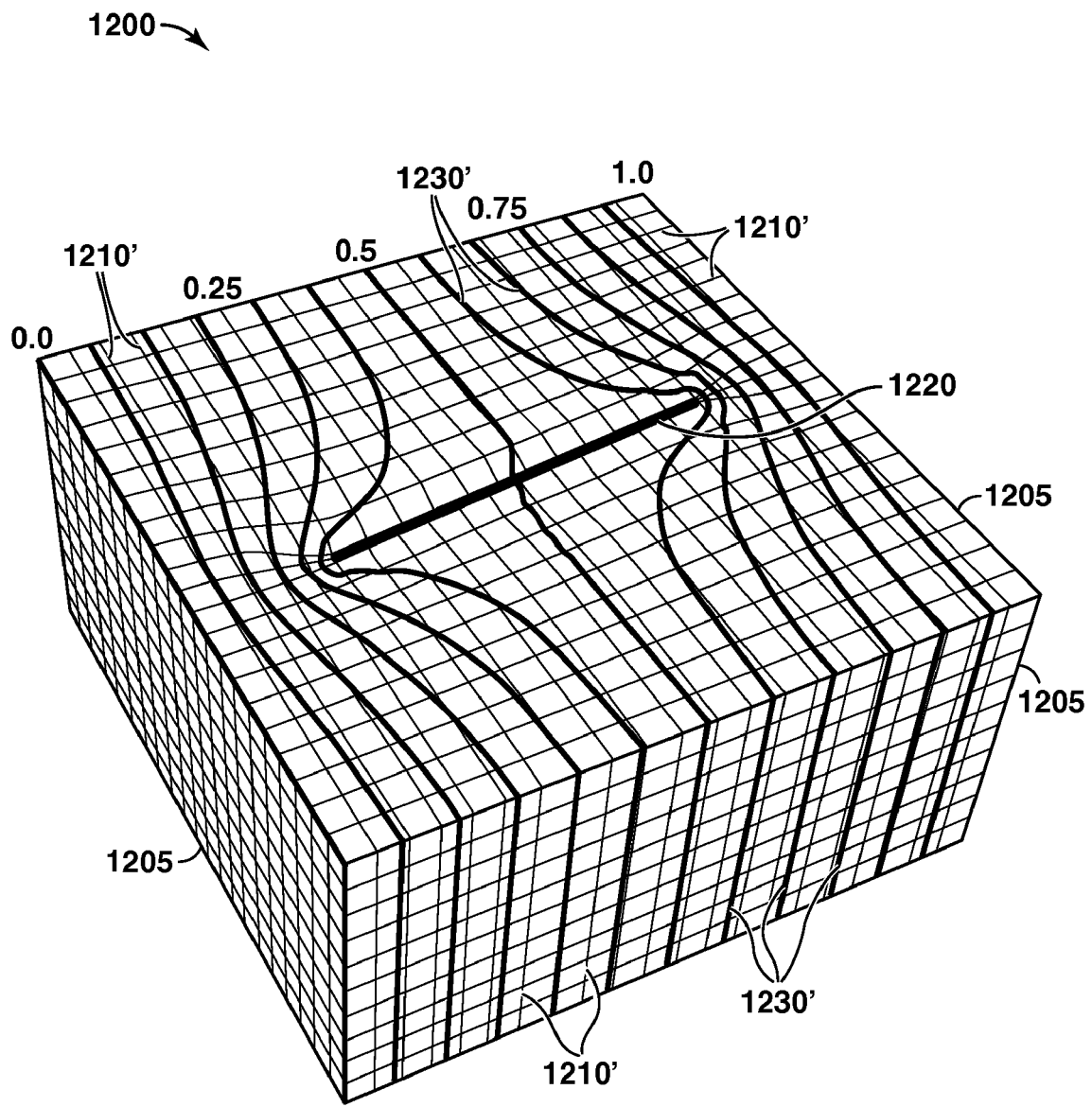
FIGS. 12(a) and 12(b) show a reservoir simulation.
Figure 12B:
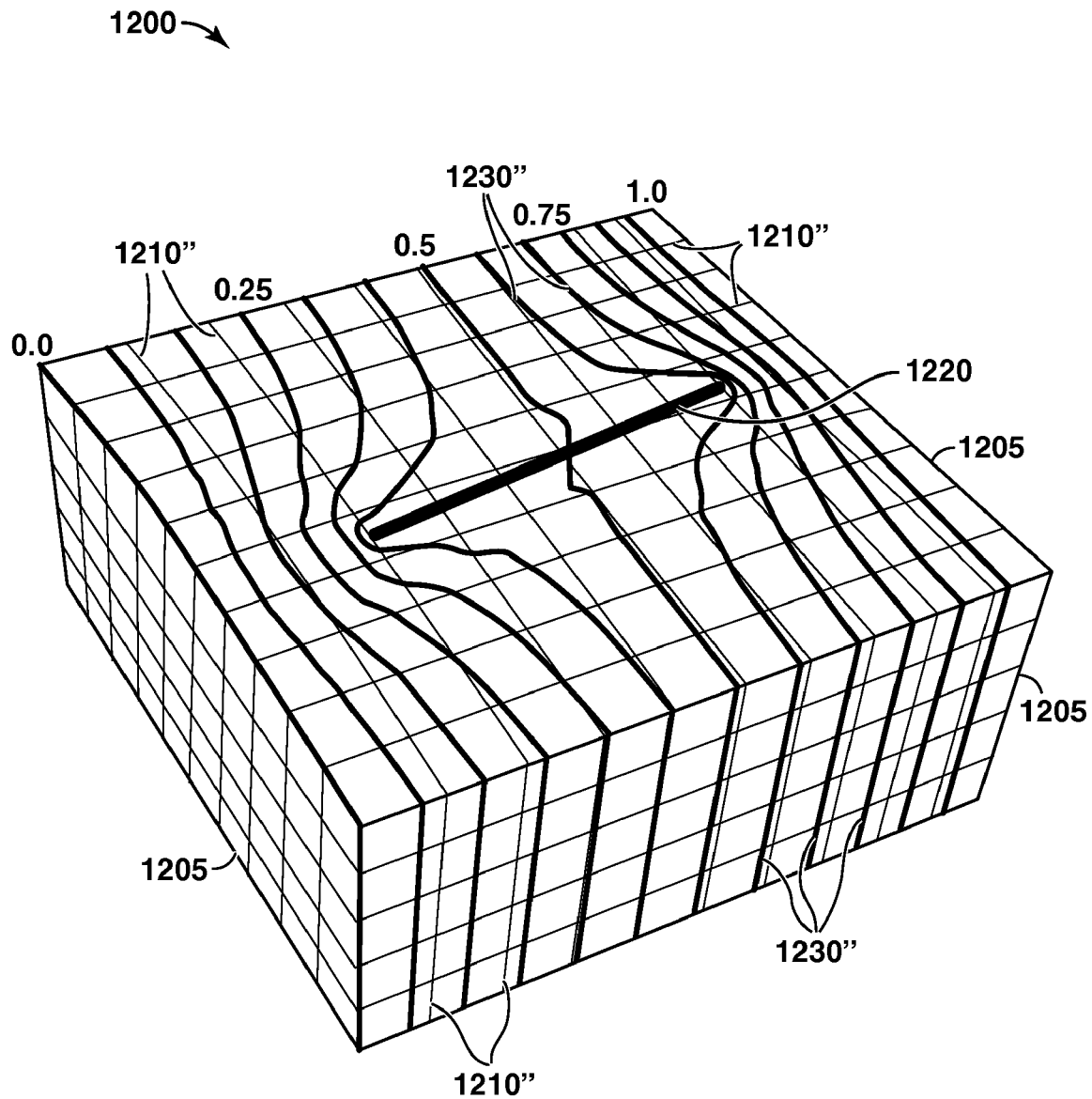

Application of the methods 1100 and 1200 are demonstrated by comparing FIG. 12(*a*) and FIG. 12(*b*). FIGS. 12(*a*) and 12(*b*) show a reservoir 1200 under simulation. In each figure physical boundaries 1205 have been volumetrically defined for the reservoir 1200. Within the physical boundaries 1205, a subsurface feature 1220 has been located. In the illustrative simulations of FIGS. 12(*a*) and 12(*b*), the subsurface feature 1220 is a natural fracture.

In each simulation the reservoir 1200 has been meshed with grid lines. FIG. 12(*a*) shows the simulated reservoir 1200 having been meshed with traditional fine scale grid lines 1210'. The grid lines 1210' honor the subsurface feature 1220 within the physical boundaries 1205 of the simulated reservoir 1200. It can be seen that the elements defined by the grid lines 1210' are non-uniform.

Pressure gradient lines 1230' are also seen in the reservoir 1200 of FIG. 12(*a*). The pressure gradient lines 1230' demonstrate pore pressure distribution in the reservoir 1200.

FIG. 12(*b*) shows the simulated reservoir 1200 having the same physical boundaries 1205. Within the physical boundaries 1205, the subsurface feature 1220 has again been located. Again, the subsurface feature 1220 is a natural fracture.

In FIG. 12(*b*) the simulated reservoir 1200 has been meshed using coarse scale grid lines 1210". The grid lines 1210" honor the contour of the subsurface feature 1220 within the physical boundaries 1205 of the simulated reservoir 1200. It can be seen that the illustrative grid lines 1210" in FIG. 12(*b*) form four-sided elements that cross over the natural fracture 1220.

Pressure gradient lines 1230" are also seen in the reservoir 1200 of FIG. 12(*b*). The pressure gradient lines 1230" demonstrate pore pressure distribution in the reservoir 1200. In comparing the pressure gradient lines 1230" of FIG. 12(*b*) with the pressure gradient lines 1230' of FIG. 12(*a*), it can be seen that the gradient lines 1230' and 1230" are highly comparable.

Referring again to the concept of completion efficiency, the numerical methods discussed herein may be employed in a variety of ways for evaluating the efficiency of a proposed completion. For example, the methods may be applied to the evaluation of flow efficiency of completions such as deviated or partially penetrating wells, wormholes, or perforated completions. The effects of such subsurface features on pore pressure field may be represented by proper mathematical functions, such as the jump function in equation (18).

It is also noted herein that simulations for determining the effect of a subsurface feature on both pore pressure and geomechanical displacement may be combined. For example, where a subsurface feature is an artificially induced fracture formed from the injection of fluid, the enrichment function may comprise two enrichment functions. A first enrichment function may comprise a pair of ramp functions to simulate the effects of the fluid injection on pore pressure, while a second enrichment function may comprise a jump function to simulate the effects of the fluid injection on geomechanical displacement. In this way, the analyst may simulate and predict the growth of a fracture.

A method for modeling a reservoir response in a hydrocarbon reservoir that involves combining enrichment functions is offered herein. The hydrocarbon reservoir again has at least one subsurface feature. In one aspect, the method includes defining physical boundaries for the subsurface system, and locating the at least one subsurface feature within the physical boundaries. The method also includes creating a finite element mesh within the physical boundaries wherein the finite element mesh has element edges that do not intentionally honor the at least one subsurface feature. The method further includes performing a computer-based numerical simulation. The simulation employs a first enrichment function that recognizes the effects of the subsurface feature and computes a pore pressure value, and a second enrichment function that recognizes the effects of the subsurface feature and computes a geomechanical displacement value within the physical boundaries.

In one aspect, the enrichment function used to recognize the effects of the subsurface feature and to compute the value for pore pressure is different from the enrichment function used to recognize the effects of the subsurface feature and to compute the value for geomechanical displacement. Alternatively, the enrichment function used to recognize the effects of the subsurface feature and to compute the value for pore pressure is the same as the enrichment function used to recognize the effects of the subsurface feature and to compute the value for geomechanical displacement.

It can be seen that improved methods for simulating a reservoir response are presented herein. The methods use finite element numerical simulation having a mesh forming elements. An enrichment function is inserted into the simulations to account for the effects of subsurface features within the reservoir.

While it will be apparent that the invention herein described is well calculated to achieve the benefits and advantages set forth above, it will be appreciated that the invention is susceptible to modification, variation and change without departing from the spirit thereof.

What is claimed is:

1. A method for modeling a reservoir response in a subsurface system, the subsurface system having at least one subsurface feature, the method comprising:
    defining physical boundaries for the subsurface system;
    locating the at least one subsurface feature within the physical boundaries;
    creating a coarse-scale finite element mesh within the physical boundaries, the coarse-scale finite element mesh having elements that do not intentionally honor the at least one subsurface feature; and
    performing a computer-based numerical simulation utilizing the coarse-scale finite element mesh to model at least one fluid-related reservoir response, wherein effects of the subsurface feature upon the at least one fluid-related reservoir response are recognized within at least one coarse-scale mesh element encountered by the subsurface feature even though the at least one coarse-scale mesh element does not intentionally honor the at least one subsurface feature.

2. The method of claim 1, wherein the subsurface system comprises a hydrocarbon reservoir.

3. The method of claim 2, wherein the reservoir response comprises pore pressure, geomechanical displacement, or both at a given location within the physical boundaries.

4. The method of claim 3, wherein the computer-based numerical simulation is a numerical simulator that uses an enrichment function to recognize the effects of the subsurface feature in the response.

5. The method of claim 4, wherein the subsurface feature cuts across at least some element edges in the mesh.

6. The method of claim 4, wherein the enrichment function is a function of distance that provides the distance of a location in the reservoir under study to the subsurface feature.

7. The method of claim 4, wherein the enrichment function is a jump function.

8. The method of claim 7, wherein the jump function is defined as:
    $f(x)$=a first value for some range of x, and
    $f(x)$=a second value outside the range of x.

9. The method of claim 8, wherein the jump function is defined as:
    $f(x)$=a first value having a first sign when $x<0$, and
    $f(x)$=a second value having a second opposite sign when $x \geqq 0$.

10. The method of claim 8, wherein:
    the subsurface feature is a boundary-type subsurface feature; and
    the jump function is applied to a domain integration in a finite element formulation.

11. The method of claim 10, wherein the domain integration is defined by the following equation:

$$\int_\Omega \nabla v \cdot K \nabla u \, d\Omega = 0$$

$$\int_\Omega \nabla v \cdot K \nabla u H(x) \, d\Omega = 0$$

where: $\Omega$ is the domain to be integrated;
- $\nabla$ is the gradient;
- • denotes the dot product;
- v is a smooth weight function that satisfies the displacement boundary conditions,
- K is the coefficient related to a material property,
- $\nabla u$ is the gradient of displacement to be solved for;
- H(x) is a jump function;
- $\nabla v$ is a gradient of the function that satisfies the Dirichlet boundary conditions; and
- $d\Omega$ is the derivative of the domain $\Omega$.

12. The method of claim 7, wherein:
the subsurface feature is (i) a fault, or (ii) a fluidized incavation in soft rock; and
the reservoir response is pore pressure or a geomechanical value.

13. The method of claim 7, wherein:
the subsurface feature is a (i) a wormhole, (ii) a wellbore, (iii) a perforation wherein the subsurface feature is treated as a surface, (iv) an interface of two subsurface layers, or (v) a grain boundary in pore scale modeling; and
the reservoir response is pore pressure or a geomechanical value.

14. The method of claim 4, wherein the enrichment function is a single ramp function.

15. The method of claim 14, wherein the ramp function is defined as either:
f(x)=a first continuous function over a first range of x; or
f(x)=a second continuous function over a second range of x;
wherein the first continuous function and the second continuous function are continuous at a junction point, but the continuation is not smooth.

16. The method of claim 15, wherein the ramp function is defined as either:
f(x)=|x|; or
f(x)=0 when x<0, and f(x)=x when x≧0.

17. The method of claim 14, wherein:
the subsurface feature is an interface of two subsurface layers wherein both layers are permeable; and
the reservoir response is pore pressure.

18. The method of claim 14, wherein:
the subsurface feature is an interface of two subsurface layers wherein both the layers are treated as bound together or wherein the layers have relative shear slip; and
the reservoir response is displacement.

19. The method of claim 14, wherein:
the subsurface feature is an interlaminary layer that is bound together; and
the reservoir response is a geomechanical value.

20. The method of claim 14, wherein:
the subsurface feature is an interlaminar layer wherein two interfacing layers are permeable; and
the reservoir response is pore pressure.

21. The method of claim 4, wherein the enrichment function is a dual ramp function.

22. The method of claim 21, wherein:
the subsurface feature is (i) a natural fracture, or (ii) an artificial fracture in hard rock; and
the reservoir response is pore pressure.

23. The method of claim 21, wherein the computer-based numerical simulation comprises a finite element approximation using a pair of ramp functions expressed by:

$$p(x) = \sum_{i=1,N^E} N_i(x) p_i + \sum_{i=1,N^E} N_i (a_i^{Ia}(\Phi^{Ia}(x) - \Phi^{Ia}(x_i)) + (b_i^{Ib}(\Phi^{Ib}(x) - \Phi^{Ib}(x_i)))$$

or optionally $$p(x) = \sum_{i=1,N^E} N_i(x) p_i + \sum_{i=1,N^{enr}} N_i(a_i^{Ia} \Phi^{Ia}(x) + b_i^{Ib} \Phi^{Ib}(x))$$

where: $\Phi^{Ia}(x) = R(f_{dist}^{Ia}(x))$
$\Phi^{Ib}(x) = R(f_{dist}^{Ib}(x))$ and wherein: p(x) is the pore pressure at location x,
- R(x) is the ramp function,
- $N^E$ is the number of nodes of the element where x resides,
- $N^{enr}$ is the number of nodes to be enriched in the element where x resides,
- $p_i$ is the value of pressure at a nodal point;
- $N_i$ is the shape function associated with node i,
- $f_{dist}^{Ia}(x)$ and $f_{dist}^{Ib}(x)$ represent the distance functions to the Interfaces $I_a$ and $I_b$, respectively,
- $x_i$ is the nodal location of the node i, and
- $a_i^{Ia}$ and $_i^{Ib}$ are the unknown parameters or "degrees of freedom" associated with the two enrichment functions.

24. The method of claim 4, wherein the enrichment function is a log function.

25. The method of claim 24, wherein:
the subsurface feature is (i) a wormhole, (ii) a wellbore, or (iii) a perforation wherein the subsurface feature is treated as a curve; and
the reservoir response is pore pressure.

26. The method of claim 4, wherein the computer-based numerical simulation comprises a finite element approximation using a single distance function expressed by:

$$u_{approx}^{EFEM}(x) = \sum_{i=1,N^E} N_i(x) u_i + \sum_{i=1,N^{enr}} (N_i(x) \sum_{j=1,N^{enr}} a_{ij}(\Phi_j(x) - \Phi_j(x_i)))$$

or optionally $$u_{approx}^{EFEM}(x) = \sum_{i=1,N^E} N_i(x) u_i + \sum_{i=1,N^{enr}} \left( N_i(x) \sum_{j=1,N^{NE}} a_{ij} \Phi_j(x) \right)$$

wherein: u(x) is the function for solving the reservoir response sought to be quantified,
- i represents a node,
- $u_i$ is the value of the reservoir response at a nodal point;
- $N^E$ is the number of nodes in the element where x resides, $N^{enr}$ is the number of nodes to be enriched in the element where x resides, $N^{NE}$ is the number of enrichment functions to be incorporated, $\Phi_j$ is the enriched function at node j;

$\Phi_i$ is the enriched function at node i;

$\Phi_j(x_i)$ is the value of enrichment function $\Phi_j$ at node i, which is located at location $x_i$, and $a_{ij}$ is a set of unknown parameters associated with the enrichment function $\Phi_j$ at node j.

27. A method of simulating a reservoir response in a hydrocarbon reservoir, the reservoir having a subsurface feature, the method comprising:
creating a coarse-scale finite element mesh for a numerical simulator of a reservoir, the mesh comprising a plurality of coarse-scale elements;
locating a subsurface feature within the reservoir and whereby the subsurface feature encounters at least one of the coarse-scale elements of the mesh and the at least one coarse-scale element does not intentionally honor the location of the subsurface feature; and
running the numerical simulator to create a solution for at least one fluid-related reservoir response at a given location within the reservoir, whereby the solution considers fluid-related effects of the subsurface feature within the at least one coarse-scale element encountered by the subsurface feature.

28. The method of claim 27, further comprising:
providing an enrichment function in the numerical simulator to capture the effects of the subsurface feature on the solution of the reservoir response.

29. The method of claim 28, wherein the reservoir response is pore pressure, geomechanical displacement, or both.

30. The method of claim 29, wherein:
the subsurface feature comprises an interface of two geological layers having different material properties; and
the enrichment function comprises a jump function.

31. The method of claim 29, wherein:
the subsurface feature comprises a fault through a geological layer; and
the enrichment function comprises a jump function.

32. The method of claim 29, wherein:
the subsurface feature is an artificially induced fracture under pressure to simulate the injection of fluid;
the enrichment function comprises a pair of ramp functions to simulate the effects of the fracture on pore pressure; and
the reservoir response is pore pressure.

33. The method of claim 29, wherein running the numerical simulator comprises:
running the numerical simulator a first time at a first completion configuration to acquire a first production rate value;
running the numerical simulator a second time at a second completion configuration to acquire a second production rate value; and
comparing the second production rate value to the first production rate value, thereby establishing a completion efficiency.

34. The method of claim 33, wherein:
the first completion configuration has no fracture; and
the second completion configuration has at least one fracture.

35. The method of claim 33, wherein:
the first completion configuration has at least one fracture of a first geometry; and
the second completion configuration has at least one fracture of a second different geometry.

36. The method of claim 29, wherein:
the subsurface feature is an artificially induced fracture under pressure to simulate the injection of fluid; and
the enrichment function comprises two enrichment functions such that a first enrichment function comprises a pair of ramp functions to simulate the effects of the fluid injection on pore pressure, and a second enrichment function comprises a jump function to simulate the effects of the fluid injection on geomechanical displacement.

37. The method of claim 36, wherein running the numerical simulator comprises:
running the numerical simulator a first time using a first fluid injection plan to acquire a first geomechanical displacement value;
running the numerical simulator a second time using a second fluid injection plan to acquire a second geomechanical displacement value; and
comparing the first geomechanical displacement value to the second geomechanical displacement value, thereby conducting an injectivity analysis.

38. The method of claim 37, wherein:
the first fluid injection plan assumes a first injection fluid having a first fluid property; and
the second fluid injection plan assumes a second fluid injection fluid having a second fluid property that is different from the first fluid property.

39. The method of claim 37, wherein:
the first fluid injection plan assumes a first rate of injection for an injection fluid; and
the second fluid injection plan assumes a second rate of injection for the injection fluid that is different from the first rate of injection.

40. The method of claim 36, wherein running the numerical simulator comprises:
running the numerical simulator a first time using a first fluid production plan to acquire a first geomechanical displacement value;
running the numerical simulator a second time using a second fluid production plan to acquire a second geomechanical displacement value; and
comparing the first geomechanical displacement value to the second geomechanical displacement value, thereby conducting a sand rate production analysis.

41. The method of claim 40, wherein:
the first fluid production plan assumes a first rate of fluid production from a wellbore; and
the second fluid production plan assumes a second rate of fluid production from the wellbore that is different from the first rate of fluid production.

42. The method of claim 29, wherein:
the subsurface feature is a wellbore;
the enrichment function comprises a log function to simulate the effects of radial pressure changes in the near wellbore region; and
the reservoir response is pore pressure.

43. The method of claim 29, further comprising:
running the numerical simulator a first time without a subsurface feature to determine a primary value for a reservoir solution;
running the numerical simulator a second time with at least one subsurface feature to determine a second value for the reservoir solution; and comparing the second value for the reservoir solution to the primary value for the reservoir solution, thereby establishing a first completion efficiency.

44. The method of claim 43, wherein further comprising:
running the numerical simulator a third time with at least two subsurface features to determine a third value for the reservoir solution;
comparing the third value for the reservoir solution to the primary value for the reservoir solution, thereby establishing a second completion efficiency; and
comparing the second completion efficiency with the first completion efficiency.

45. A method for determining an optimum hydrocarbon reservoir operation for a hydrocarbon-containing reservoir that has at least one subsurface feature, the method comprising:
locating at least one subsurface feature within the reservoir;
creating a coarse-scale finite element mesh representative of the reservoir, the finite element mesh having elements that cross the at least one subsurface feature;
providing a computer-based numerical simulation tool incorporating the coarse-scale finite element mesh and adapted to simulate one or more fluid-related response and one or more geomechanical response wherein the effects of the subsurface feature are recognized in the one or more fluid-related response within at least one coarse-scale element that crosses the subsurface feature by use of an enrichment function;
operating the numerical simulation tool at a first set of parameters to determine a first reservoir response value;
operating the numerical simulation tool at a second set of parameters to determine a second reservoir response value; and
comparing the first reservoir response value with the second reservoir response value to make an engineering judgment about hydrocarbon reservoir operation.

46. The method of claim 45, wherein the reservoir response is pore pressure or displacement at a given location within the reservoir.

47. The method of claim 46, wherein the enrichment function is a signed distance function that provides the distance of a location in the reservoir under study to the subsurface feature.

48. The method of claim 46, wherein the subsurface feature is at least one of a natural fracture, an artificial fracture, a wellbore perforation, an interlaminar layer and a fault.

49. A method for modeling a reservoir response in a hydrocarbon reservoir, the hydrocarbon reservoir having at least one subsurface feature, the method comprising:
defining physical boundaries for the subsurface system;
locating the at least one subsurface feature within the physical boundaries;
creating a coarse-scale finite element mesh within the physical boundaries, the finite element mesh having element edges that do not intentionally honor the at least one subsurface feature; and
performing a computer-based numerical simulation utilizing the coarse-scale finite element mesh that employs a first enrichment function that recognizes the effects of the subsurface feature and computes a pore pressure value, and a second enrichment function that recognizes the effects of the subsurface feature and computes a geomechanical displacement value wherein effects of the subsurface feature upon the pore pressure value and the geomechanical displacement value are recognized within at least one coarse-scale element encountered by the subsurface feature even though the at least one coarse-scale element has edges that do not intentionally honor the at least one subsurface feature.

50. The method of claim 49, wherein the enrichment function used to recognize the effects of the subsurface feature and to compute the value for pore pressure is different from the enrichment function used to recognize the effects of the subsurface feature and to compute the value for geomechanical displacement.

51. A method for modeling a reservoir response in a subsurface system, the subsurface system having at least one subsurface feature, the method comprising:
defining physical boundaries for the subsurface system;
locating the at least one subsurface feature within the physical boundaries;
creating a coarse-scale finite element mesh within the physical boundaries, the coarse-scale finite element mesh having elements that do not intentionally honor the at least one subsurface feature; and
performing a computer-based numerical simulation utilizing the coarse-scale finite element mesh to model at least one reservoir response selected from both (i) one or more fluid-related responses and (ii) one or more geomechanical responses, wherein effects of the one-or more fluid related response and one or more geomechanical responses by the subsurface feature are recognized within at least one coarse-scale mesh element encountered by the subsurface feature even though the at least one coarse-scale mesh element does not intentionally honor the at least one subsurface feature.

52. The method of claim 51, wherein the computer-based numerical simulation is a numerical simulator that uses an enrichment function to recognize the effects of the subsurface feature in the response.

53. The method of claim 52, wherein the enrichment function is a function of distance that provides the distance from a location in the reservoir under study to the subsurface feature.

* * * * *